(12) United States Patent
Augustsson

(10) Patent No.: US 11,772,540 B2
(45) Date of Patent: Oct. 3, 2023

(54) NAVIGATOR

(71) Applicant: FQ IP AB, Mölndal (SE)

(72) Inventor: Per Augustsson, Mölndal (SE)

(73) Assignee: FQ IP AB, Mölndal (SE)

( * ) Notice: Subject to any disclaimer, the term of this patent is extended or adjusted under 35 U.S.C. 154(b) by 0 days.

(21) Appl. No.: 17/837,133

(22) Filed: Jun. 10, 2022

(65) Prior Publication Data

US 2022/0371501 A1    Nov. 24, 2022

Related U.S. Application Data

(63) Continuation of application No. PCT/EP2021/085673, filed on Dec. 14, 2021.

(51) Int. Cl.
*B60P 3/06* (2006.01)
*B60L 50/60* (2019.01)
*B62D 63/02* (2006.01)
*B62D 47/00* (2006.01)

(52) U.S. Cl.
CPC .......... *B60P 3/06* (2013.01); *B60L 50/60* (2019.02); *B62D 63/025* (2013.01); *B62D 47/006* (2013.01)

(58) Field of Classification Search
CPC .......... B60P 3/06; B60L 50/60; B62D 63/025; B62D 63/02; B62D 53/005; B62D 61/12; B62D 47/006
See application file for complete search history.

(56) References Cited

U.S. PATENT DOCUMENTS

| | | | |
|---|---|---|---|
| 6,404,159 B1* | 6/2002 | Cavallini | B60L 50/60 318/587 |
| 2004/0015266 A1 | 1/2004 | Skoog | |
| 2004/0073337 A1 | 4/2004 | McKee et al. | |
| 2004/0093650 A1 | 5/2004 | Martins et al. | |
| 2013/0173089 A1* | 7/2013 | Bernstein | G05D 1/0016 180/21 |
| 2017/0182924 A1* | 6/2017 | Lendo | G05D 1/0261 |

(Continued)

FOREIGN PATENT DOCUMENTS

| | | |
|---|---|---|
| CN | 215711496 U | 2/2022 |
| DE | 102013020833 A1 | 6/2015 |

(Continued)

*Primary Examiner* — Karen Beck
(74) *Attorney, Agent, or Firm* — Flaster Greenberg P.C.

(57) ABSTRACT

A guiding vehicle (100) for an intralogistics system, wherein the guiding vehicle (100) is remote controlled or autonomous and configured to be connected to a self-propelled load bearing cart (200), and guide and control the propulsion of the self-propelled load bearing cart (200) such that the load bearing cart (200) can transport a load in the intralogistics system. The guiding vehicle (100) comprising a mechanical connector (170) for mechanically connecting the guiding vehicle (100) to the load bearing cart (200) and a connector for transferring data. The guiding vehicle (100) is configured to receive navigation data from the self-propelled load bearing cart (200), using the connector for transferring data, in the form of information concerning the movement of a drive wheel of the load bearing cart (200) obtained from at least one motor of the load bearing cart (200) or from at least one encoder connected to the drive wheel.

16 Claims, 8 Drawing Sheets

(56) References Cited

U.S. PATENT DOCUMENTS

| | | | |
|---|---|---|---|
| 2017/0190048 A1 | 7/2017 | Vice et al. | |
| 2018/0072212 A1* | 3/2018 | Alfaro | B60K 7/0007 |
| 2020/0071084 A1* | 3/2020 | Mauletti | B62D 65/022 |
| 2020/0102147 A1 | 4/2020 | Sullivan et al. | |
| 2021/0354924 A1* | 11/2021 | Augustsson | B62D 63/02 |
| 2022/0024738 A1 | 1/2022 | Le Polotec et al. | |

FOREIGN PATENT DOCUMENTS

| | | | | |
|---|---|---|---|---|
| DE | 102014105460 A1 * | 10/2015 | | A47L 11/18 |
| DE | 102020104801 A1 * | 7/2021 | | |
| EP | 3705971 A1 * | 9/2020 | | B62D 53/005 |
| JP | 2010122916 A * | 6/2010 | | G05D 1/0227 |
| JP | 2017019392 A * | 1/2017 | | |
| WO | 0138945 A1 | 5/2001 | | |
| WO | 2019172821 A1 | 9/2019 | | |
| WO | 2020089170 A1 | 5/2020 | | |
| WO | 2021079251 A1 | 4/2021 | | |

\* cited by examiner

NAVIGATOR

CROSS-REFERENCE TO RELATED APPLICATIONS

This application is a continuation of PCT Patent Application No. PCT/EP2021/085673, filed Dec. 14, 2021, which claims the benefit of European Patent Application No. 20214305.3, filed Dec. 15, 2020, the disclosure of which is incorporated herein by reference in their entireties.

FIELD OF THE INVENTION

This invention relates to remote controlled or autonomous guiding vehicles for guiding self-propelled load bearing carts in an intra-logistic system as well as intra-logistic systems and self-propelled load bearing carts for use in such systems.

BACKGROUND ART

All forms of handling of goods, material or items of manufacturing requires intralogistics, i.e. logistics within some confined area such as a factory, warehouse or yard. Traditionally, forklifts have been the dominating vehicle both for transporting pallets of smaller items and larger items individually. Forklifts however have many limitations. They are generally limited to lifting items specifically adapted for the forks, such as pallets. They also require a relatively large clearance to operate and they are the root of many work place accidents. The forklifts are thus not suitable for use in environments populated with human workers. As a consequence, forklifts are being replaced in many environments by manual carts pushed by human workers. The carts are less likely to cause accidents and are much more adaptable to specific uses or sizes of the transported items. However, the manual carts also have drawbacks, such as limitations of the maximum load capacity that a human operator can handle, and in that the logistic system becomes relatively labor intensive.

SUMMARY

It is an object to mitigate, alleviate or eliminate one or more of the above-identified deficiencies in the art and disadvantages singly or in any combination.

According to one aspect, a guiding vehicle for an intralogistics system is provided. The guiding vehicle is remote controlled or autonomous and configured to be connected to a self-propelled load bearing cart, and guide and control the propulsion of the self-propelled load bearing cart such that the self-propelled load bearing cart can transport a load in the intralogistics system. The guiding vehicle comprising a mechanical connector for mechanically connecting the guiding vehicle to the self-propelled load bearing cart and a connector for transferring data. The guiding vehicle is configured to receive navigation data from the self-propelled load bearing cart, using the connector for transferring data, in the form of information concerning the movement of a drive wheel of the self-propelled load bearing cart obtained from at least one motor of the self-propelled load bearing cart, or from at least one encoder connected to the drive wheel, and wherein the guiding vehicle is smaller than the self-propelled load bearing cart.

By receiving information concerning the movement of a drive wheel of the self-propelled load, the guiding vehicle can keep track of the exact movements of the self-propelled load bearing cart which enables the guiding vehicle to securely and autonomously guide and navigate the self-propelled load bearing cart.

According to one embodiment, the mechanical connector is configured to be connected by means of a horizontal movement, along the floor surface, between the guiding vehicle and the self-propelled load bearing cart.

According to one embodiment, the mechanical connector comprises an actuator for moving the mechanical connector vertically in relation to the floor surface and thereby mechanically connect the guiding vehicle to the self-propelled load bearing cart.

According to one embodiment, the guiding vehicle comprises an electrical energy storage, and wherein the guiding vehicle is configured to transfer electrical energy from the electrical energy storage to the self-propelled load bearing cart by means of the electrical connector, for at least one of: propelling the self-propelled load bearing cart and handling the load placed on the self-propelled load bearing cart.

According to one embodiment, the mechanical connector comprises a recess or a protrusion for connection with a corresponding recess or protrusion positioned on the self-propelled load bearing cart.

According to one embodiment, the guiding vehicle further comprises at least one of: a connector for a pressurized fluid, such that a pressurized fluid can be transferred to or from the guiding vehicle, and a connector for transferring visible light from the guiding vehicle to the self-propelled load bearing cart.

According to one embodiment, the at least one of the electrical connector, the connector for a pressurized fluid and the connector for transferring visible light is part of an integrated connector together with the mechanical connector enabling simultaneous connection of the mechanical connector and at least one of the electrical connector, the connector for a pressurized fluid and the connector for transferring visible light.

According to one embodiment, the guiding vehicle has a size such that it can be placed within the footprint of the self-propelled load bearing cart.

According to one embodiment, the guiding vehicle is configured to be placed at least partially underneath the load carried by the self-propelled load bearing cart.

According to one embodiment, the total length of the guiding vehicle is less than 50% of the total length of the self-propelled load bearing cart.

According to one embodiment, the weight of the guiding vehicle is less than 50% of the weight of the self-propelled load bearing cart.

According to one embodiment, the footprint of the guiding vehicle is less than 50% of the footprint of the self-propelled load bearing cart.

According to one embodiment, the guiding vehicle is configured to receive an emergency stop signal generated by an emergency switch on the self-propelled load bearing cart, the emergency switch being configured to be pressed by an operator, and wherein the guiding vehicle is configured to control the propulsion of the self-propelled load bearing cart on the basis of the received stop signal, for stopping the self-propelled load bearing cart.

According to one embodiment, the guiding vehicle is configured to be completely lifted from the floor surface.

According to one embodiment, the guiding vehicle comprises an actuator for lifting the guiding vehicle in relation to the self-propelled load bearing cart.

A self-propelled load bearing cart for use in an intralogistics system is further provided. The self-propelled load bearing cart is configured to be connected to the guiding vehicle according to any one of the embodiments herein, and be guided and controlled by the guiding vehicle such that the self-propelled load bearing cart can transport a load in the intralogistics system. The self-propelled load bearing cart comprising at least one motor connected to a drive wheel configured to engage a floor surface for propelling the self-propelled load bearing cart, a mechanical connector for mechanically connecting the self-propelled load bearing cart to the guiding vehicle and a connector for transferring data. The self-propelled load bearing cart is configured to transmit navigation data to the guiding vehicle using the connector for transferring data, in the form of information concerning the movement of the drive wheels of the self-propelled load bearing cart, obtained from the at least one motor of the self-propelled load bearing cart, or from at least one encoder connected to the drive wheels. The self-propelled load bearing cart is larger than the guiding vehicle.

According to one embodiment, the self-propelled load bearing cart comprises lighting elements configured to be illuminated by visible light transferred from the guiding vehicle by means of the connector for transferring visible light.

According to one embodiment, the self-propelled load bearing cart comprises at least one emergency switch configured to be pressed by an operator. The self-propelled load bearing cart is configured to transfer a signal from the at least one emergency switch to the guiding vehicle.

According to one embodiment, the self-propelled load bearing cart is configured to carry a load in the range 300-2000 kg.

According to one embodiment, the self-propelled load bearing cart comprises support structures connecting a frame of the self-propelled load bearing cart to the wheels of the self-propelled load bearing cart, and wherein the support structures have a first length, along a first axis parallel to a plane, when the support structures are mounted to the frame, and wherein the support structures further have a second length, along an axis parallel to the first axis, which is less than ⅓ of the length of the first length.

According to one embodiment, the mechanical connector comprises a recess or a protrusion for connection with a corresponding recess or protrusion positioned on the self-propelled load bearing cart.

According to one embodiment, the self-propelled load bearing cart further comprises at least one of: a connector for a pressurized fluid, such that a pressurized fluid can be transferred to or from the self-propelled load bearing cart, and a connector for transferring visible light from the guiding vehicle to the self-propelled load bearing cart.

According to one embodiment, the total length of the self-propelled load bearing cart is more than 200% of the total length of the guiding vehicle.

According to one embodiment, the weight of the self-propelled load bearing cart is more than 200% of the weight of the guiding vehicle.

According to one embodiment, the footprint of the self-propelled load bearing cart is more than 200% of the footprint of the guiding vehicle.

According to one embodiment, the guiding vehicle is configured to be completely lifted from the floor surface.

According to one embodiment, the self-propelled load bearing cart comprises an actuator for lifting the guiding vehicle in relation to the self-propelled load bearing cart.

According to another aspect, a guiding vehicle for an intralogistics system is provided. The guiding vehicle is remote controlled or autonomous and configured to be connected to a self-propelled load bearing cart and guide and control the propulsion of the self-propelled load bearing cart such that the self-propelled load bearing cart can transport a load in the intralogistics system. The guiding vehicle comprising at least one drive wheel configured to engage a floor surface for propelling the guiding vehicle, at least one additional wheel and a mechanical connector for mechanically connecting the guiding vehicle to the self-propelled load bearing cart. The guiding vehicle further comprises a transceiver configured to at least one of: send and receive navigation data to or from the self-propelled load bearing cart. The guiding vehicle is configured to maintain constant traction between the at least one drive wheel and the floor surface when the guiding vehicle is connected to the self-propelled load bearing cart by means of the mechanical connector, such that constant traction between the at least one drive wheel and the floor surface can be maintained when the interconnected guiding vehicle and self-propelled load bearing cart travels over an uneven floor surface.

By maintain constant traction, the guiding vehicle can keep track of the exact movements of the self-propelled load bearing cart which enables the guiding vehicle to securely and autonomously guide and navigate the self-propelled load bearing cart.

According to one embodiment, the guiding vehicle is configured such that the at least one additional wheel is lifted from the floor surface while the drive wheel remains in contact with the floor surface when the guiding vehicle is connected to the self-propelled load bearing cart. Lifting the additional wheel increases the traction between the floor surface and the drive wheels which helps ensure that the drive wheels have constant traction.

According to one embodiment, the guiding vehicle comprises at least one of an actuator and an elastic element configured to lift the additional wheel from the floor surface when the guiding vehicle is connected to the self-propelled load bearing cart.

According to one embodiment, the guiding vehicle comprises at least one of an actuator and an elastic element configured to act as suspension for the additional wheel when the guiding vehicle is connected to the self-propelled load bearing cart. The elastic element configured to act as suspension for the additional wheel may be configured to be substantially unaffected by the weight of guiding vehicle alone, and be elastically deformed by the combined weight of the guiding vehicle and the self-propelled load bearing cart, such that the elastic element acts as suspension for the additional wheel when the guiding vehicle is connected to the self-propelled load bearing cart.

According to one embodiment, the mechanical connector is configured to be connected by means of a horizontal movement, along the floor surface, between the guiding vehicle and the self-propelled load bearing cart, which means that the guiding vehicle can be connected to the self-propelled load bearing cart by driving into the mechanical connection.

According to one embodiment, the mechanical connector comprises an actuator for moving the mechanical connector vertically in relation to the floor surface and thereby mechanically connect the guiding vehicle to the self-propelled load bearing cart.

The guiding vehicle may further comprise an electrical connector for electrically connecting the guiding vehicle to the self-propelled load bearing cart.

The guiding vehicle may further comprise an electrical energy storage, and the guiding vehicle may be configured to transfer electrical energy from the electrical energy storage to the self-propelled load bearing cart by means of the electrical connector, for at least one of: propelling the self-propelled load bearing cart and handling the load placed on the self-propelled load bearing cart.

According to one embodiment, the mechanical connector comprises a recess or a protrusion for connection with a corresponding recess or protrusion positioned on the self-propelled load bearing cart. The recess or protrusion may comprise a slanted surface configured to provide a lifting force that lifts the additional wheel from the floor surface. This enables the additional wheel to be lifted from the floor surface without the use of an additional actuator.

The guiding vehicle may further comprise at least one of a connector for a pressurized fluid, such that a pressurized fluid can be transferred to or from the guiding vehicle, and a connector for transferring visible light from the guiding vehicle to the self-propelled load bearing cart.

The electrical connector, the connector for a pressurized fluid and the connector for transferring visible light may be part of an integrated connector together with the mechanical connector enabling simultaneous connection of the mechanical connector and at least one of the electrical connector, the connector for a pressurized fluid and the connector for transferring visible light According to one embodiment, the guiding vehicle is smaller than the self-propelled load bearing cart and configured to be placed within the footprint of the self-propelled load bearing cart and underneath the load carried by the self-propelled load bearing cart.

A self-propelled load bearing cart for use in an intralogistics system is further provided. The self-propelled load bearing cart being configured to be connected to a guiding vehicle and be guided and controlled by the guiding vehicle, such that the self-propelled load bearing cart can transport a load in the intralogistics system. The self-propelled load bearing cart comprising at least one motor connected to a drive wheel configured to engage a floor surface for propelling the self-propelled load bearing cart. The self-propelled load bearing cart further comprises a mechanical connector for mechanically connecting the self-propelled load bearing cart to the guiding vehicle. The self-propelled load bearing cart provides sectors of unobstructed visibility in a first plane for at least one navigation sensor placed on the guiding vehicle, when the guiding vehicle is placed within the footprint of the self-propelled load bearing cart and connected to the self-propelled load bearing cart. The unobstructed visibility is more than 100 degrees in a first direction and more than 100 degrees in the opposite direction in the first plane.

The self-propelled load bearing cart may further comprises lighting elements configured to be illuminated by visible light transferred from the guiding vehicle by means of the connector for transferring visible light. Lighting elements illuminated by visible light are very reliable, durable, low cost and does not require any maintenance.

The self-propelled load bearing cart may further comprise at least one emergency switch configured to be pressed by an operator. The self-propelled load bearing cart may then be configured to transfer a signal from the at least one emergency switch to the guiding vehicle.

A cleaning nozzle for cleaning a navigation sensor on an autonomous vehicle is further provided. The cleaning nozzle comprising an inlet for receiving a cleaning fluid, a channel, fluidly connected to the inlet, and a plurality of outlets distributed in the channel. The channel has a curved extension and the plurality of outlets are positioned along the curved extension such that the flow directions of the plurality of outlets vary with the curved extension. The cleaning nozzle enables the navigation sensor to be cleaned from multiple directions without the need for moving the cleaning nozzle.

According to one embodiment, the curved extension extends at least 90°, preferably at least 180° and most preferably about 270°, such that a large portion of the navigation sensor can be cleaned simultaneously.

According to one embodiment, the plurality of outlets are positioned on an inside of the curved extension.

According to one embodiment, the flow directions of the plurality of outlets are configured for directing the cleaning fluid towards the navigation sensor from different angels along the curved extension.

According to one embodiment, the curved extension of the channel extends mainly in a first plane and the flow direction of the plurality of outlets are configured for directing the cleaning fluid at least partly out of the first plane.

According to one embodiment, the flow directions of the plurality of outlets have at least two different flow direction angles relative the first plane, such that the flow of fluid cleans a larger portion of the navigation sensor.

According to one embodiment, the curvature of the extension of the channel is about 10 mm-100 mm, preferably about 20 mm-80 mm.

The cleaning fluid may be at least one of: pressurized air, a gas, and a liquid.

The nozzle may comprise a receiving area for receiving a navigational sensor to be cleaned, and the receiving area is arranged on an inner side of the curved extension of the channel.

A Navigation sensor cleaning system for a charging station for an autonomous vehicle is further provided. The navigation sensor cleaning system comprises a cleaning nozzle according to any one of the preceding embodiments, a cleaning fluid source for providing cleaning fluid into the inlet, and a control unit for activating the cleaning system upon detection of the presence of a navigation sensor to be cleaned.

A method for cleaning a navigation sensor on an autonomous vehicle is further provided. The method comprises the steps of detecting the presence of a navigation sensor in a navigation sensor cleaning system, providing a cleaning fluid to an inlet of a cleaning nozzle, directing the flow of cleaning fluid along a curved extension of a channel in the cleaning nozzle, and ejecting a cleaning fluid through a plurality of outlets distributed in the channel and having a plurality of flow directions directed towards the navigation sensor.

According to one embodiment, at least one of the steps are performed during a charging of the autonomous vehicle, when the autonomous vehicle is at a standstill anyway, According to one embodiment, the cleaning nozzle is used for carrying out the steps of directing and ejecting the cleaning fluid.

Please note that any aspect or part of an aspect as well as any method or part of method or any unit, feature or system could be combined in any applicable way if not clearly contradictory.

BRIEF DESCRIPTIONS OF THE DRAWINGS

The invention will by way of example be described in more detail with reference to the appended schematic drawings, on which:

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness.

Variations to the disclosed embodiments can be understood and effected by the skilled person in practicing the claimed invention, from a study of the drawings, the disclosure, and the appended claims.

A logistic system using guiding vehicles for moving self-propelled load bearing carts is provided, as well as self-propelled load bearing carts for moving loads in such a system and guiding vehicle guiding and controlling the self-propelled load bearing carts in the system. The logistics system may be used in an intralogistics system in which material, goods or items need to be transported in an efficient and/or autonomous way.

Figure 1:
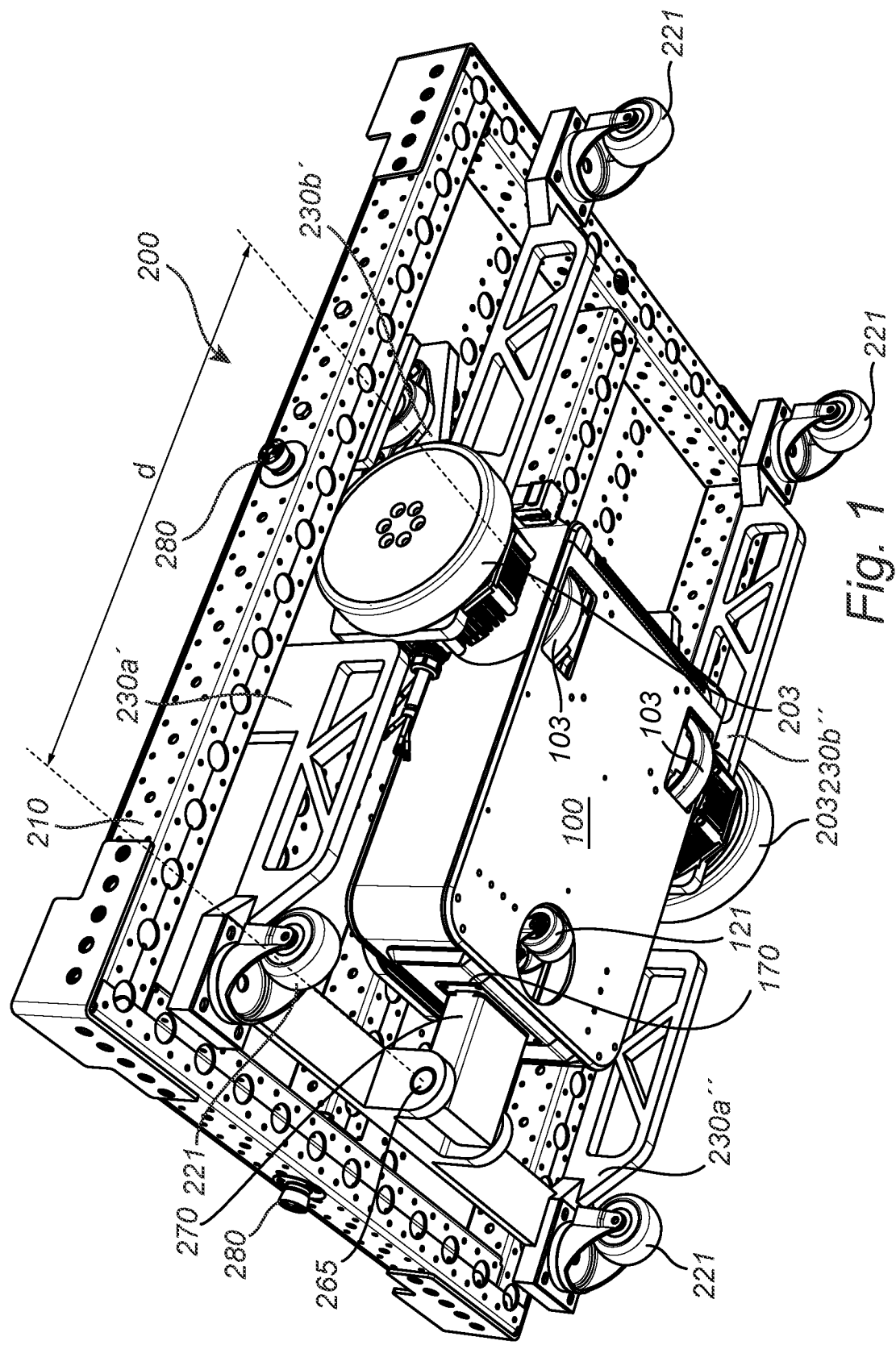
FIG. 1 shows a guiding vehicle and a self-propelled load bearing cart for an intralogistics system slightly from underneath and from the left.

FIG. 1 shows a guiding vehicle 100 for an intralogistics system when the guiding vehicle 100 is placed underneath and connected to a self-propelled load bearing cart 200. The view is slightly from underneath and from the left. The guiding vehicle 100 is remote controlled and/or autonomous and is configured to guide and control the propulsion of the self-propelled load bearing cart 200, such that the self-propelled load bearing cart 200 can transport a load in the intralogistics system, when connected to the guiding vehicle 100. In the embodiment shown in FIG. 1, the guiding vehicle 100 comprises two drive wheels 103 configured to engage a floor surface for propelling the guiding vehicle 100. The guiding vehicle 100 further comprises at least one additional wheel 121, in the form of a swiveling castor.

The guiding vehicle 100 further comprises a mechanical connector 170 for mechanically connecting the guiding vehicle 100 to the mechanical connector 270 of the self-propelled load bearing cart 200.

In the embodiment shown in FIG. 1, the mechanical connector 270 is hinged at a point of pivot 265, such that the guiding vehicle 100 can pivot in relation to the self-propelled load bearing cart 200, when the guiding vehicle 100 is connected to the self-propelled load bearing cart 200. The mechanical connection 170,270 is further described with reference to FIGS. 3 and 4.

The guiding vehicle 100 further comprising a transceiver (further described with reference to FIGS. 3 and 4) configured to send and receive navigation data to and from the self-propelled load bearing cart 200. Navigation data could e.g. be data from a navigational sensor, such as a LIDAR located on the guiding vehicle 100 (further shown with reference to FIG. 4), or located on the self-propelled load bearing cart 200. Navigation data could also be information about the surroundings received by the guiding unit 100 or self-propelled load bearing cart 200 from external sources, such as a factory or warehouse layout, or information from an external navigation sensor being stationary or mobile (such as a stationary LIDAR, IR-sensor or a LIDAR on another remote controlled or autonomous vehicle). Navigation information could also be information concerning the movement of the drive wheels 103,203 of the guiding vehicle 100 and/or the self-propelled load bearing cart 200. The information on the movement of the drive wheels 103,203 could preferably be obtained by an encoder connected to the drive wheels 103, 203. Navigation information could also be an emergency stop signal.

An emergency stop signal could for example be generated by an operator pushing an emergency stop button 280 located on the self-propelled load bearing cart 200. The emergency stop signal may then be transferred by means of an electrical connection between the self-propelled load bearing cart 200 and the guiding vehicle 100 such that the guiding vehicle 100 can control the propulsion of the self-propelled load bearing cart 200 for stopping the self-propelled load bearing cart 200.

Navigation information could also be information related to the load of the self-propelled load bearing cart 200 or related to surface conditions or traffic conditions.

In the embodiment shown in FIG. 1, the guiding vehicle 100 is configured to maintain constant traction between the drive wheels 103 and the floor surface when the guiding vehicle 100 is connected to the self-propelled load bearing cart 200 by means of the mechanical connector 170,270.

In the embodiment shown in FIG. 1, the constant traction between the drive wheels 103 and the floor surface is maintained by the additional wheel 121 being lifted from the floor surface while the drive wheels 103 remains in contact with the floor surface when the guiding vehicle 100 is connected to the self-propelled load bearing cart 200. Alternatively, the additional wheel 121 is suspended by an elastic element, such as a spring or a hydraulic or pneumatic suspension. The suspension for the additional wheel 121 is configured to be substantially unaffected by the weight of guiding vehicle 103 alone, and be elastically deformed by the combined weight of the guiding vehicle 100 and the self-propelled load bearing cart 200. This means that the additional wheel 121 is moves in a vertical direction if e.g. an uneven surface increases the pressure from the floor on the additional wheel 121. This means that the additional wheel 121 is spared from the large strain that would otherwise affect the additional wheel 121 and the mechanical connection 170,270 by the large weight of the self-propelled load bearing cart 200.

In embodiments in which the additional wheel 121 is lifted from the floor surface, such lifting could be made e.g. by a linear electrical actuator which is activated for lifting the additional wheel 121 when the guiding vehicle 100 is connected to the self-propelled load bearing cart 200.

The self-propelled load bearing cart 200 has two drive wheels 203 and four swiveling castors 221, one swiveling castor substantially in each one of the four corners of the self-propelled load bearing cart 200. The swiveling castors 221 are fixated to support structures 230a, 230b which in turn are fixated to the frame 210 of the self-propelled load bearing cart 200 by means of screws. The emergency stop button 280 is also fixated to the frame 210 of the self-propelled load bearing cart 200.

The mechanical connector 270 of the self-propelled load bearing cart 200 comprises a protrusion for connection with a corresponding recess of the self-propelled load bearing cart 100 (this is further described with reference to FIGS. 3 and 4). In one embodiment, the protrusion comprises a slanted surface configured to provide a lifting force that lifts the additional wheel 121 from the floor surface.

In the embodiment shown in FIG. 1 the drive wheels 103 are positioned at a distance d from the point of pivot 265, as such, the drive wheels 103 can pivot up and down as the interconnected guiding vehicle 100 and self-propelled load bearing cart 200 travels over an uneven surface while maintaining constant traction between the drive wheels 103 of the guiding vehicle 100 and the floor surface. In embodiment in which the additional wheel 121 is lifted from the floor surface, the weight carried by the drive wheels 103 is increased by the lifting of the additional wheel 121, which means that the force creating the traction between the drive wheels 103 and floor surface is increased, which facilitates the maintain of the constant traction between the floor surface and the drive wheels 103.

In an alternative embodiment, all wheels of the guiding vehicle are lifted from the floor surface, such that the entire guiding vehicle is lifted from the floor surface. The weight of the self-propelled load bearing cart is thus increased which increases the force creating the traction between the drive wheels of the self-propelled load bearing cart and the floor surface. In embodiments in which the entire guiding vehicle is lifted from the floor surface, the guiding vehicle is configured to receive navigation data from the self-propelled load bearing cart in the form of information concerning the movement of a drive wheel of the self-propelled load bearing cart obtained from at least one motor of the self-propelled load bearing cart, or from at least one encoder connected to at least one the drive wheel of the self-propelled load bearing cart. Information concerning the movement of the at last one drive wheel is preferably received from two drive wheels of the self-propelled load bearing cart, such that turning and drive pattern of the self-propelled load bearing cart can be assessed. For lifting the guiding vehicle, the guiding vehicle may be equipped with an actuator, such as a linear actuator. In the alternative, the self-propelled load bearing cart may be equipped with an actuator, such as a linear actuator.

Figure 2A:
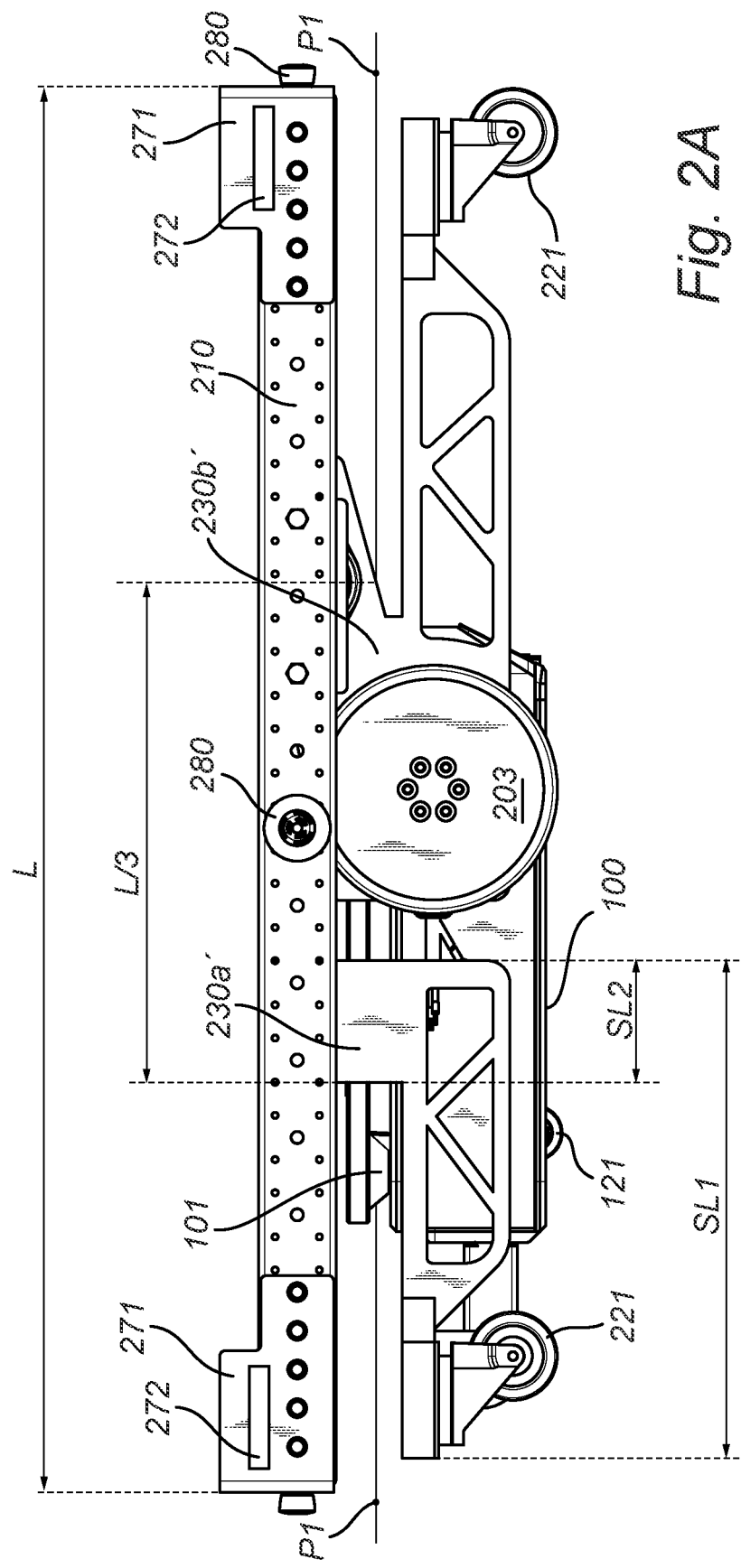
FIG. 2A shows a guiding vehicle and a self-propelled load bearing cart for an intralogistics system in a plain view from the left.

FIG. 2A shows the guiding vehicle 100 for an intralogistics system according to the embodiment shown in FIG. 1, when the guiding vehicle 100 is placed underneath and connected to a self-propelled load bearing cart 200. The view is a plain view from the left-hand side of the interconnected guiding vehicle 100 and self-propelled load bearing cart 200.

The self-propelled load bearing cart 200 has two drive wheels 203 and four swiveling castors 221, one swiveling castor substantially in each one of the four corners of the self-propelled load bearing cart 200. The swiveling castors 221 are fixated to support structures 230a', 230b' which in turn are fixated to the frame 210 of the self-propelled load bearing cart 200 by means of screws. The emergency stop button 280 is also fixated to the frame 210 of the self-propelled load bearing cart 200 and electrically connected to the mechanical connector connecting the self-propelled load bearing cart 200 to the guiding vehicle 100 for transmitting an emergency stop signal from the emergency stop button 280 on the frame of the self-propelled load bearing cart 200 to the guiding vehicle 100 such that the guiding vehicle 100 can act on the emergency stop signal and control the propulsion of the self-propelled load bearing cart 200 accordingly.

The two support structures 230a', 230b' are configured such that the self-propelled load bearing cart 200 provides sectors of unobstructed visibility in a first plane P1 for a navigation sensor 101 in the form of a LIDAR placed on the guiding vehicle 100. This sectors of unobstructed visibility enable the two LIDARs (front and rear) of the guiding vehicle 100 to function as the navigation sensor 101 for the interconnected guiding vehicle 100 and self-propelled load bearing cart 200, when the guiding vehicle 100 is placed within the footprint of the self-propelled load bearing cart 200 and connected to the self-propelled load bearing cart 200. As further shown in FIG. 2B, the unobstructed visibility is more than 100 degrees in a first, frontal, direction and more than 100 degrees in the opposite, rear, direction in the first plane P1. In the embodiment shown in FIGS. 2A and 2B, the self-propelled load bearing cart 200 provides unobstructed visibility of more than 120 degrees in a first, frontal, direction and more than 120 degrees in the opposite, rear, direction.

The sectors of unobstructed visibility are enabled by the support structures 230a, 230b being fixated to the frame 210 of the self-propelled load bearing cart 200 centrally such that the front and rear portions, as well as the corners of the plane P1 is substantially without obstructing structures. In the embodiment shown in FIG. 2A, the support structures 230a',230b' obstructs the visibility of the LIDARS in the first plane P1 along a distance being about ⅓ of the length L of the self-propelled load bearing cart 200. A preferred configuration is that the support structures 230a',230b' obstructs the visibility of the LIDARS in the first plane P1 along a distance being less than ½ of the length L of the self-propelled load bearing cart 200. In other words, the support structures 230a', 230b' are configured such that they have a first length SL1, along a first axis parallel to the plane P1, when the support structures 230a, 230b are mounted to the frame 210. The support structures 230a', 230b' further have a second length SL2, along an axis parallel to the first axis, which is less than ⅓ of the length of the first length SL1.

In the embodiment shown in FIG. 2A, the corners of the self-propelled load bearing cart 200 comprises support elements 271 for supporting a Euro-pallet, such that the Euro-pallet remains fixated on the self-propelled load bearing cart 200 when the self-propelled load bearing cart 200 moves. In alternative embodiments, the support elements 271 in the corners may be omitted or replaced by elements for the fixation of further structures on the self-propelled load bearing cart 200, such as a shelf or rack system, or any elements suitable for the fixation or support of goods being transported by the self-propelled load bearing cart 200.

In the embodiment shown in FIG. 2, the corners of the self-propelled load bearing cart 200 comprises lighting elements 272 configured to be illuminated by visible light transferred from the guiding vehicle 100 by means of a connector for transferring visible light (further described with reference to FIG. 3.).

Figure 2B:
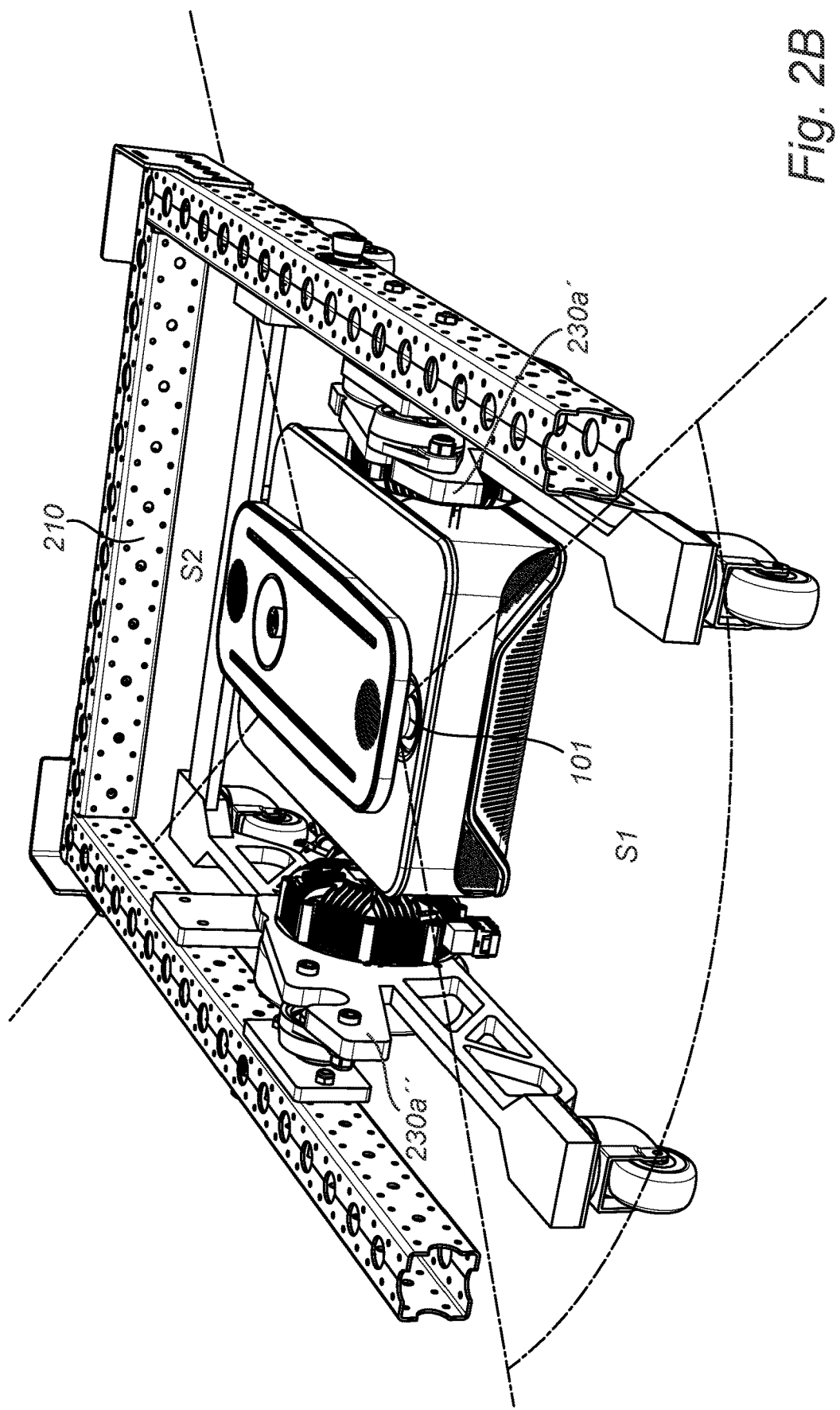
FIG. 2B shows a guiding vehicle and a self-propelled load bearing cart for an intralogistics system in an elevated view.

FIG. 2B shows the interconnected guiding vehicle 100 and self-propelled load bearing cart 200, when the guiding vehicle 100 is placed within the footprint of the self-propelled load bearing cart 200 and connected to the self-propelled load bearing cart 200. In the view of FIG. 2B, the top surface and the rear part of the frame 210 has been removed to show the sectors of unobstructed visibility S1 and S2. The sectors of the unobstructed visibility S1 and S2 are more than 100 degrees in a first, frontal, direction and more than 100 degrees in the opposite, rear, direction in the first plane (P1 of FIG. 2A). In the embodiment shown in 2B, the self-propelled load bearing cart 200 provides a first sector S1 of unobstructed visibility of more than 120 degrees in a first, frontal, direction and a second sector S2 of unobstructed visibility more than 120 degrees in the opposite, rear, direction.

The sectors of unobstructed visibility S1, S2 are enabled by the support structures 230a', 230a", 230b', 230b" being fixated to the frame 210 of the self-propelled load bearing cart 200 centrally such that the front and rear portions, as well as the corners of the plane is substantially without obstructing structures.

Figure 3:
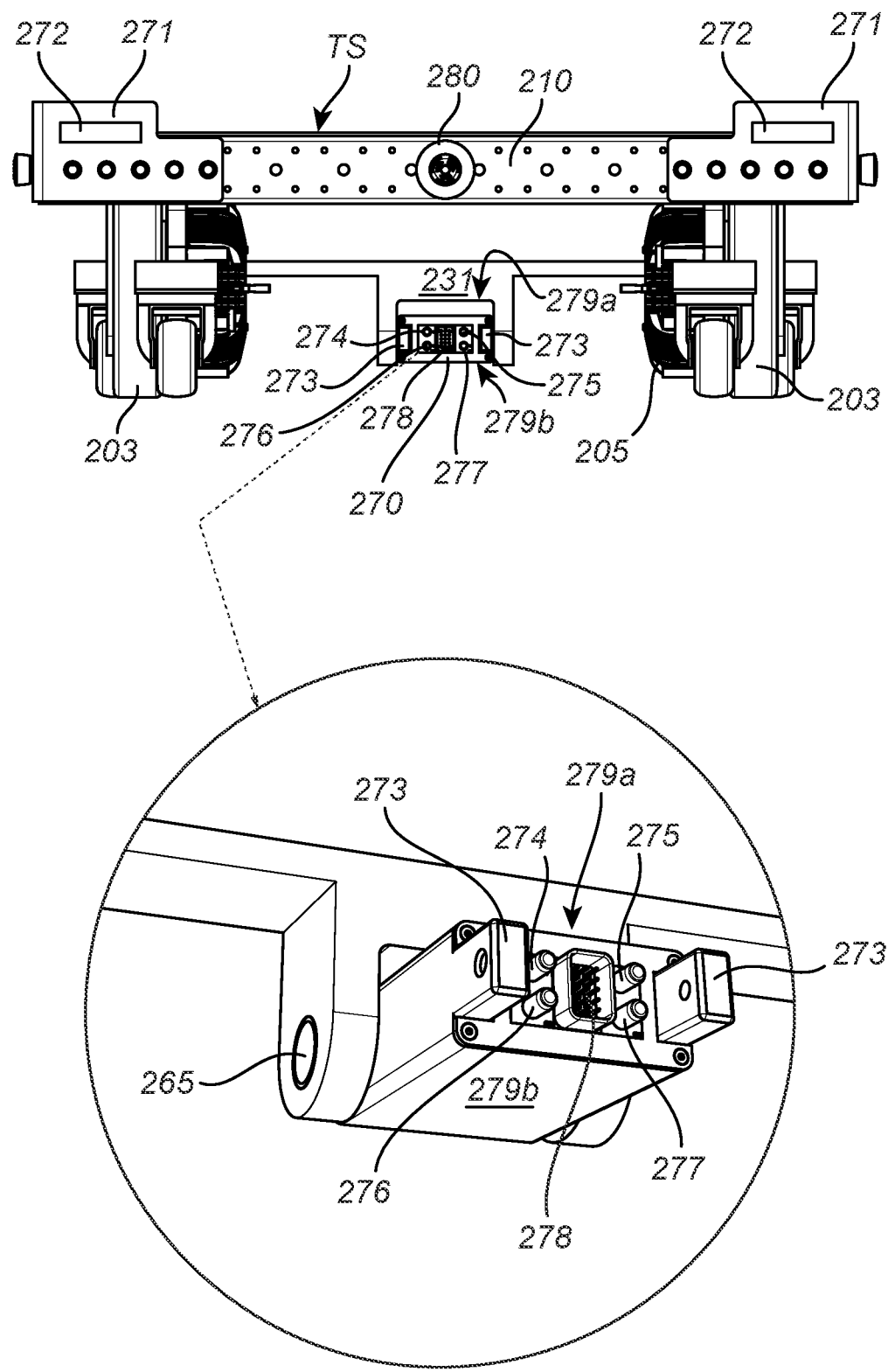
FIG. 3 shows a self-propelled load bearing cart for an intralogistics system in a plain view from the rear.

FIG. 3 shows the self-propelled load bearing cart 200 in a rear plain view. The mechanical connector 270 of the self-propelled load bearing cart 200 is positioned centrally underneath the frame 210 of the self-propelled load bearing cart 200. The mechanical connector 270 is configured to enable the guiding vehicle to be connected to the self-propelled load bearing cart 200. The mechanical connector 270 is positioned in the front portion and front half of the self-propelled load bearing cart 200 and facing rearwards such that the guiding vehicle will be positioned substantially centrally underneath, and within the footprint of the self-propelled load bearing cart 200, when the guiding vehicle is connected to the self-propelled load bearing cart 200.

The mechanical connector 270 is pivotally mounted to a linking support 231 which in turn is connected to the support structures 230a',230a". The mechanical connector 270 being pivotally mounted enables the guiding vehicle to pivot in relation to the self-propelled load bearing cart 200, when the guiding vehicle is connected to the self-propelled load bearing cart 200.

The mechanical connector 270 comprises two protruding connection element 273 which are adapted to be connected to connection recesses of the guiding vehicle. In the embodiment shown in FIG. 3, the protruding connection elements 273 are used for guiding the mechanical connector 270 such that the interface of the mechanical connector 270 is aligned and can be safely connected. In embodiments in which the additional wheel of the guiding vehicle is lifted from the floor surface, such lifting could be made by the interconnection of the mechanical connection 270 by the protruding connection elements 273 comprising a slanted surface on the upper distal surface of the protruding connection elements 273 for engaging an element fixated to the additional wheel and thus providing the lifting force that lifts the additional wheel from the floor surface The mechanical connector 270 shown in the embodiment of FIG. 3 comprises two electrical connectors 274, 275 for electrically connecting the guiding vehicle to the self-propelled load bearing cart. The first electrical connector 274 is configured for electrically connecting the guiding vehicle to the motors 205 or motor controllers of the self-propelled load bearing cart 200 such that the guiding vehicle can control the propulsion of the self-propelled load bearing cart 200. The first electrical connector may also be adapted for powering equipment for handling the load placed on the self-propelled load bearing cart 200, such as rollers for loading/unloading The second electrical connector 275 is configured for transferring electrical energy for the purpose of charging a battery on the self-propelled load bearing cart 200, from a battery on the guiding vehicle, or for the purpose of charging a battery on the guiding vehicle from a battery on the self-propelled load bearing cart 200.

The mechanical connector 270 shown in the embodiment of FIG. 3 further comprises a connector for a pressurized fluid 276, such that a pressurized fluid can be transferred from the guiding vehicle to the self-propelled load bearing cart 200.

The mechanical connector 270 shown in the embodiment of FIG. 3 further comprises a connector for transferring visible light 277 from the guiding vehicle to the self-propelled load bearing cart 200. The visible light is transferred in an optical fiber and the connector for transferring visible light 277 is a connector for connecting optical fibers. The visible light is in the embodiment shown in FIG. 3 used for illuminating the lighting elements 272 positioned in the corners of the self-propelled load bearing cart 200. Lighting elements 272 illuminated by visible light through an optical fiber are very reliable, durable, low cost and does not require any maintenance.

The mechanical connector 270 shown in the embodiment of FIG. 3 further comprises a connector for transferring data 278. The transferred data could for example be navigation data to and from the guiding vehicle. Navigation data could e.g. be data from the navigation sensors (shown as 101 in FIG. 2A) of the guiding vehicle. Navigation data could be information about the surroundings received by the guiding unit or information concerning the movement of the drive wheels 203 of the self-propelled load bearing cart 200 obtained from the motors 205 of the self-propelled load bearing cart 200 or from encoders connected to the drive wheels 203. Navigation information could also be an emergency stop signal generated by an operator pushing an emergency stop button 280 located on the self-propelled load bearing cart 200. The emergency stop signal is transferred by means of the connector for transferring data 278 from the self-propelled load bearing cart 200 to the guiding vehicle, such that the guiding vehicle can control the propulsion of the self-propelled load bearing cart 200 for stopping the self-propelled load bearing cart 200.

In the embodiment shown in FIG. 3, the electrical connectors 274,275, the connector for a pressurized fluid 276 and the connector for transferring visible light 277, as well as the connector for transferring data 278, is part of an integrated connector together with the mechanical connector 270 enabling simultaneous connection of the mechanical connector 270 and the rest of the connectors. However, in alternative embodiments, it is equally conceivable that the some of the additional connectors are separate from the mechanical connector 270.

The mechanical connector 270 further comprises an elastic element (not shown) configured to lift the mechanical connector 270 when the mechanical connector 270 is disconnected from the guiding vehicle, such that the mechanical connector 270 is not dragged in the floor surface.

The elastic element may further be configured to create an elastic downward force on the guiding vehicle, such that the pressure on the wheels of the guiding vehicle is increased by the connection with the self-propelled load bearing cart 200. As an example, the elastic element may be a torsion spring configured to elastically bias the mechanical connector 270 in a direction 5 degrees negative in relation to the horizontal plane. Such a torsion spring could increase the force on the wheels of the guiding vehicle with 10 N or more or with 30 N or more, which with increase the traction between the wheels of the guiding vehicle and the floor surface which facilitates the maintenance of the traction between the guiding vehicle and the floor surface as the interconnected guiding vehicle and self-propelled load bearing cart 200 travels over an uneven floor surface.

The guiding vehicle and the self-propelled load bearing cart 200 in the embodiment of FIGS. 1-3 are configured to be interconnected by means of the mechanical connector 270 by means of a horizontal movement, along the floor surface, between the guiding vehicle and the self-propelled load bearing cart 200. This essentially means that the guiding vehicle drives in under the self-propelled load bearing cart 200 and to the mechanical connector 270 which then is vertically at the correct distance from the floor surface. In instances in which the floor surface as somewhat uneven, the pivotal function of the hinged mechanical connector 270 enables the mechanical connector 270 to compensate for an uneven floor and steer the mechanical connector 270 to the correct position by means of rounded or chamfered edges of the protruding elements 273.

When the guiding vehicle and the self-propelled load bearing cart 200 are interconnected by means of the mechanical connector 270, both the mechanical connector 270, the guiding vehicle and the self-propelled load bearing cart 200 are horizontally aligned such that the upper and lower surfaces 279a, 279b of the mechanical connector 270 are parallel with the floor surface, the frame 210 of the self-propelled load bearing cart 200 is parallel with the floor surface, and the upper and lower surface of the guiding vehicle is parallel to the floor surface.

In an alternative embodiment (not shown) the guiding vehicle and the self-propelled load bearing cart are configured to be interconnected by means of a mechanical connector by means of a vertical movement. I.e. the mechanical connector is a vertical mechanical connector placed underneath self-propelled load bearing cart and configured to receive a corresponding mechanical connector placed at the top surface of the guiding vehicle. In one embodiment, the mechanical connector comprises an actuator for moving the mechanical connector vertically in relation to the floor surface and thereby mechanically connect the guiding vehicle to the self-propelled load bearing cart. The actuator may be assisted or replaced by at least one elastic element configured to exert a force between the guiding vehicle and the self-propelled load bearing cart for increasing the force between the drive wheel and the floor surface when the guiding vehicle is connected to the self-propelled load bearing cart.

In alternative embodiments, active suspension of the wheels of the guiding vehicle lifts the guiding vehicle for creating the vertical interconnection between the guiding vehicle and the self-propelled load bearing cart.

In the embodiment shown in FIG. 3, the self-propelled load bearing cart 200 comprises a computing unit configured to control the drive unit and thus the drive wheels, handle input from sensors on the self-propelled load bearing cart 200 and for handling communication. Preferably, the computing unit on the self-propelled load bearing cart 200 is a much smaller and simpler computing unit than the computing unit of the guiding vehicle.

The self-propelled load bearing cart 200 may further comprise a wireless transceiver, which may be a wireless communication unit, configured to transmit and receive wireless communication to and/or from a guiding vehicle and/or a mobile unit operated by a driver and/or a stationary wireless unit being part of a logistic system. The wireless communication could be information or data e.g. relating to driving or navigation of the self-propelled load bearing cart 200, or identity information or information with regards to the load on the self-propelled load bearing cart 200 (weight, height etc.).

The self-propelled load bearing cart 200 may be powered by the energy source of the guiding vehicle. However, in alternative embodiments the self-propelled load bearing cart may have an energy source of its own which is used on its own or in combination with the energy source of the guiding vehicle. The energy source of the self-propelled load bearing cart 200 may be a smaller battery capable of powering the self-propelled load bearing cart 200 for short movements (such as short directly controlled movements by an operator). The energy source of the self-propelled load bearing cart 200 may be configured to be charged by and from the guiding vehicle by means of the electrical connection 275.

In alternative embodiments it is also conceivable that the self-propelled load bearing cart 200 comprises only a single drive wheel which could be adapted for propulsion only, or for steering and propulsion. In embodiments in which a single drive wheel is adapted for steering and propulsion, the single wheel is turnable by means of for example a powered actuator. In embodiments in which the single drive wheel is configured for propulsion only, the self-propelled load bearing cart may be steered by the guiding vehicle.

In conceivable embodiments, the self-propelled load bearing cart 200 may also be used as part of a warehouse system, or as part of a station on an assembly line, which sometimes means that the self-propelled load bearing cart 200 will remain on the same spot for a long time, during which the batteries may be depleted. Having an energy source with sufficient energy in the guiding vehicle for powering the self-propelled load bearing cart 200 removes this problem as the self-propelled load bearing cart 200 can be easily energized by the batteries of the guiding vehicle.

In the embodiment shown in FIGS. 1-3, the self-propelled load bearing cart 200 is configured to carry a single Euro-pallet and the size of the top surface TS of the self-propelled load bearing cart 200 thus has a size adapted therefor. However, in alternative embodiments, the size of the self-propelled load bearing cart 200 may be different, e.g. for carrying two Euro-pallets or for holding a rack or shelf system. In embodiments in which the self-propelled load bearing cart 200 is made larger, or made for sustaining a larger load, the number of swiveling castors may be increased accordingly.

In some embodiments, the corner modules 271 may further comprise contact sensors for creating an emergency stop signal in case the self-propelled load bearing cart 200 inadvertently makes contact with an object or person. The emergency stop signal may be transferred to the guiding vehicle such that the guiding vehicle can control the propulsion of the self-propelled load bearing cart 200.

Figure 4:
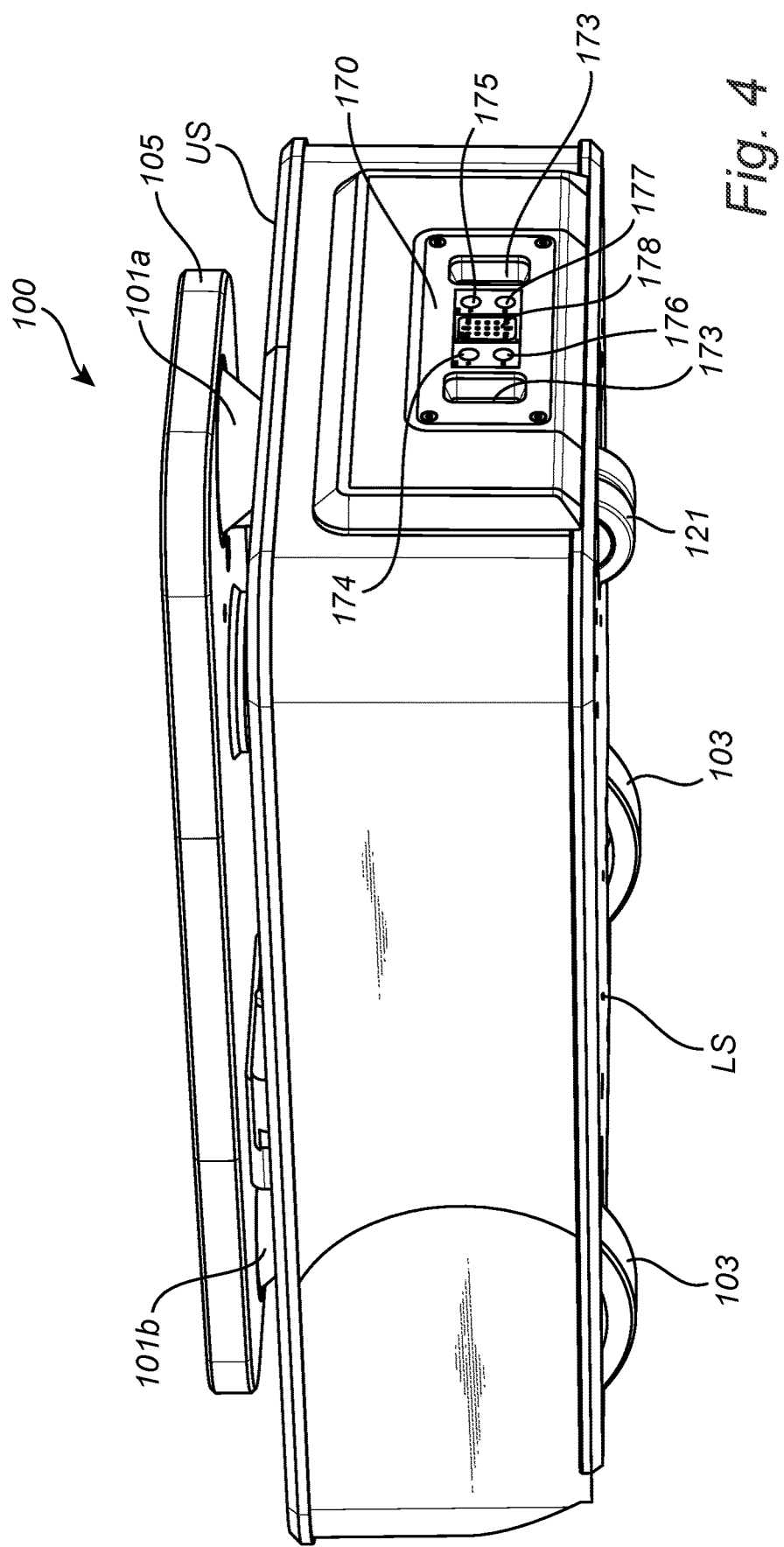
FIG. 4 shows a guiding vehicle for an intralogistics system in a view from the left.

FIG. 4 shows the guiding vehicle in a perspective view from the left. The guiding vehicle 100 has two drive wheels 103 located at the rear corners of the guiding vehicle 100 and one swiveling castor 121 located centrally in the front of the guiding vehicle 100. The two drive wheels 103 enables control in all directions on a planar surface by altering the rotational speed and/or direction of the drive wheels 103. The drive wheels 103 are drive wheels 103 suitable for use in a warehouse or factory setting and may be drive wheels 103 suitable for use on a flat concrete floor. The drive wheels are connected to rotary encoders, sensing the rotational speed of a particular drive wheel 103. The information derived by the rotary encoder may be used to compare the rotational speed of a particular drive wheel 103 to the speed of other drive wheel(s) or the speed of the self-propelled load bearing cart. The information of the movement of the drive wheels 103 is used as navigation information, it is important that traction is maintained between the floor surface and the drive wheels 103.

The guiding vehicle 100 has a lower surface LS configured to be parallel to the floor surface. The top portion of the guiding vehicle 100 comprises an upper surface US parallel to the lower surface LS and configured to house a first frontal LI DAR 101a and a second, rear LI DAR 101b. The two LIDARS 101a,101b are protected by a protective roof 105. The two LIDARS creates an image of the surroundings of the guiding vehicle 100 such that the guiding vehicle 100 can navigate and provide navigational information to, and control, a self-propelled load bearing cart.

In the front of the guiding vehicle 100 is a mechanical connector 170 configured to be interconnected with the mechanical connector of the self-propelled load bearing cart. The mechanical connector comprises two recesses 173 configured to receive the two protruding connection elements of the self-propelled load bearing cart. The openings of the recesses 173 have chamfered surfaces configured to steer the protruding connection elements for aligning the mechanical connection.

In the embodiment shown in FIG. 4, constant traction between the drive wheels 103 and the floor surface is maintained by the additional wheel 121 being lifted from the floor surface while the drive wheels 103 remains in contact with the floor surface when the guiding vehicle 100 is connected to the self-propelled load bearing cart. Alternatively, the additional wheel 121 is suspended by an elastic element, such as a spring or a hydraulic or pneumatic suspension. The suspension for the additional wheel 121 is configured to be substantially unaffected by the weight of guiding vehicle 103 alone and be elastically deformed by the combined weight of the guiding vehicle 100 and the self-propelled load bearing cart. This means that the additional wheel 121 is moves in a vertical direction if e.g. an uneven surface increases the pressure from the floor on the additional wheel 121.

In embodiments in which the additional wheel 121 is lifted from the floor surface, such lifting could be made either by the interconnection of the mechanical connection 170 by the protruding connection elements comprising a slanted surface engaging an element fixated to the additional wheel 121 and thus providing the lifting force that lifts the additional wheel 121 from the floor surface. In the alternative, the guiding vehicle 100 may comprise a linear electrical actuator which is activated for lifting the additional wheel 121 when the guiding vehicle 100 is connected to the self-propelled load bearing cart. The additional wheel 121 need only be lifted a short distance for creating the increased pressure on the drive wheels 103 for increasing the traction between the drive wheels and the floor surface. The distance may be shorter than 40 mm, or shorter than 30 mm or shorter than 20 mm. The mechanical connection 170 may further comprise a locking member for securely locking the mechanical connection 170 for ensuring that the mechanical connection is secure. In the embodiment in which the guiding vehicle 100 comprises an electrical linear actuator, the mechanical connection 170 may provide a signal to the electrical linear actuator indicating that the mechanical connection is completed and secure such that the additional wheel 121 can be lifted.

The mechanical connector 170 shown in the embodiment of FIG. 4 (and corresponding to the mechanical connector 270 shown in the embodiment of FIG. 3) comprises two electrical connectors 174, 175 for electrically connecting the guiding vehicle 100 to the self-propelled load bearing cart. The first electrical connector 174 is configured for electrically connecting the guiding vehicle 100 to the motors/motor controllers of the self-propelled load bearing cart such that the guiding vehicle 100 can control the propulsion of the self-propelled load bearing cart. The first electrical connector 174 may also be adapted for powering equipment for handling the load placed on the self-propelled load bearing cart, such as rollers for loading/unloading The second electrical connector 175 is configured for transferring electrical energy for the purpose of charging a battery on the self-propelled load bearing cart, from a battery on the guiding vehicle 100, or for the purpose of charging a battery on the guiding vehicle 100 from a charger or charging station connected to the electrical grid, or from a battery on the self-propelled load bearing cart or on another guiding vehicle 100.

The mechanical connector 170 shown in the embodiment of FIG. 3 further comprises a connector for a pressurized fluid 176, such that a pressurized fluid can be transferred from the guiding vehicle 100 to the self-propelled load bearing cart.

The mechanical connector 170 shown in the embodiment of FIG. 3 further comprises a connector for transferring visible light 177 from the guiding vehicle 100 to the self-propelled load bearing cart. The visible light is transferred in an optical fiber and the connector for transferring visible light 177 is a connector for connecting optical fibers. The visible light may be used for illuminating lighting elements positioned on the self-propelled load bearing cart. Lighting elements illuminated by visible light through an optical fiber are very reliable, durable, low cost and does not require any maintenance.

The mechanical connector 170 shown in the embodiment of FIG. 4 further comprises a connector for transferring data 178. The transferred data could for example be navigation data to and from the guiding vehicle. Navigation data could e.g. be data from the LIDARS 101a,101b. Navigation data could also be information about the surroundings received by the guiding unit or information concerning the movement of the drive wheels of the self-propelled load bearing cart obtained from the motors of the self-propelled load bearing cart or from encoders connected to the drive wheels. Navigation information could also be the movement of the drive wheels 103 of the guiding vehicle 100 obtained from the motors of the guiding vehicle or from encoders connected to the drive wheels 103. Navigation information could also be an emergency stop signal generated by an operator pushing an emergency stop button located on the self-propelled load bearing cart. The emergency stop signal is transferred by means of the connector for transferring data 178 from the self-propelled load bearing cart to the guiding vehicle 100, such that the guiding vehicle 100 can control the propulsion of the self-propelled load bearing cart for stopping the self-propelled load bearing cart.

The guiding vehicle 100 shown in FIG. 4 is remote controlled and/or autonomous and is more competent, faster and lighter than the self-propelled load bearing cart, but lack the load bearing capabilities. The guiding vehicle 100 is smaller than the self-propelled load bearing cart and configured to be placed within the footprint of the self-propelled load bearing cart and underneath the load carried by the self-propelled load bearing cart. This makes it possible to exclude sophisticated, sensitive and expensive components from the self-propelled load bearing cart, making the self-propelled load bearing cart easier to manufacture, more robust and reduces the maintenance cost of the self-propelled load bearing cart. As the load bearing cart is self-propelled, i.e. not pulled by the guiding vehicle 100, the guiding vehicle 100 can be made small, light and fast, making it possible to have the guiding vehicle 100 move about for example a factory setting without many of the risks to human operators that unavoidably are present when moving a large and heavy load bearing cart. It is also possible to have guiding vehicles 100 coordinating a larger amount of self-propelled load bearing carts. It is also possible to have one type of guiding vehicle guiding and controlling a large variety of self-propelled load bearing carts. In the embodiment shown in FIG. 4, the guiding vehicle 100 is less than 50% of the size of the self-propelled load bearing cart (100 of FIG. 1). The length of the guiding vehicle is less than 50% of the length of the self-propelled load bearing cart (200 of FIG. 1), the width of the guiding vehicle 100 is less than 50% of the width of the self-propelled load bearing cart (200 of FIG. 1), the weight of the guiding vehicle 100 is less than 50% of the weight of the self-propelled load bearing cart, and the footprint of the guiding vehicle 100 is less than 50% of the footprint of the self-propelled load bearing cart. In alternative embodiments, the length and/or width and/or weight and/or footprint of the guiding vehicle 100 may be less than 30% of the length and/or width and/or weight and/or footprint of the self-propelled load bearing cart (200 of FIG. 1).

The guiding vehicle 100 has a top speed which is at least 200% of the top speed of the self-propelled load bearing cart, which means that the guiding vehicle 100 can move around in an environment, such as a factory, much quicker when not being connected to a self-propelled load bearing cart.

However, the guiding vehicle 100 lacks load bearing capabilities and have a weight in the range 10-100 kg, which means that that the motors of the guiding vehicle 100 only need to create a torque sufficient for accelerating the guiding vehicle 100 with a weight in the range 10-100 kg and the breaks only need to be capable of deaccelerating the guiding vehicle 100 with a weight in the range 10-100 kg.

In contrast, the self-propelled load bearing cart described with reference to FIGS. 1-3 are configured to carry a load in the range 300-2000 kg, which means that the motors of the self-propelled load bearing cart need to create a torque sufficient for accelerating the self-propelled load bearing cart with a weight in the range 300-2000 kg and the breaks of the self-propelled load bearing cart need to be capable of deaccelerating the self-propelled load bearing cart with a weight in the range 300-2000 kg.

In one exemplifying embodiment, the combined motors for the propulsion of the self-propelled load bearing cart is configured for generating a maximum torque being 3 times the maximum torque of the combined motors for the propulsion of the guiding vehicle 100.

In another exemplifying embodiment, the combined motors for the propulsion of the self-propelled load bearing cart is configured for generating a maximum torque being 6 times the maximum torque of the combined motors for the propulsion of the guiding vehicle 100.

The guiding vehicle 100 also reduces the requirements of the level of sophistication of the safety systems of the self-propelled load bearing cart, as the guiding vehicle 100 can guide, navigate and sense the environment and control the movement of the self-propelled load bearing cart.

In the embodiment shown in FIG. 4, the electrical connectors 174,175, the connector for a pressurized fluid 176 and the connector for transferring visible light 177, as well as the connector for transferring data 178, is part of an integrated connector together with the mechanical connector 170 enabling simultaneous connection of the mechanical connector 170 and the rest of the connectors. However, in alternative embodiments, it is equally conceivable that the some of the additional connectors are separate from the mechanical connector 170.

The guiding vehicle 100 further comprises a wireless communication unit configured to transmit and receive wireless communication to and/or from at least one of: a self-propelled load bearing cart, other guiding vehicles or stationary wireless units being part of the logistic system. The wireless communication unit could be based on the IEEE 802.11 standard (WLAN or Wi-Fi) or UHF radio communication such as the IEEE 802.15.1 standard (Bluetooth) or a wireless communication unit based on the 3GPP NR standards (5G) enabling Ultra-Reliable Low-Latency Communications (URLLC). The wireless communication could be information or data e.g. relating to the identity of the guiding vehicles or the identity of the self-propelled load bearing carts. The wireless communication between the self-propelled load bearing cart and the guiding vehicle 100 may be bidirectional, such that the guiding vehicle 100 may transmit and/or receive information from/to the self-propelled load bearing cart, which information could comprise, apart from identity information, specifics of the load on the self-propelled load bearing cart (weight, height etc.). It is further possible to transmit and/or receive more complex data such as navigation information such as driving instructions or information about the surroundings to or from the guiding vehicle 100.

The guiding vehicle 100 further comprises a computing unit which is much more sophisticated than the computing unit of the self-propelled load bearing cart. The more sophisticated computing unit of the guiding vehicle 100 has a faster processing unit, a larger storage capacity, faster connection to other guiding units or to the logistics systems or to the self-propelled load bearing carts. The computing unit of the guiding vehicle 100 further comprises more I/O-units than the computing unit of the self-propelled load bearing cart, enabling the guiding vehicle 100 to receive input from more sensors. The computing unit receives input from the LIDARS 101a,101b and generates control signals on the basis thereof, which then can be transferred via the connection 178 or via wireless connection, to the self-propelled load bearing cart for controlling the drive unit of the self-propelled load bearing cart. Alternative sensors on the guiding vehicle 101 could be radar units, sonic sensor units and/or optical sensor units, IR or cameras using image recognition.

FIGS. 5-8 illustrates a close up on the navigational sensor 101 and more specifically on a cleaning nozzle 400 for cleaning said navigational sensor. The cleaning sensor works very well with the guiding vehicle for intralogistics system as is described above and will in the following example mainly be described in relation to this vehicle. However, the cleaning nozzle may be used for any navigational sensor on any autonomous vehicle.

The navigation sensor may be subject to different contaminations when the vehicle is navigating. It could for example be dust or other particles in production unit, or vegetational contamination (such as grass, small leaves, or pollen) if the autonomous vehicle is driven outside.

Figure 5:
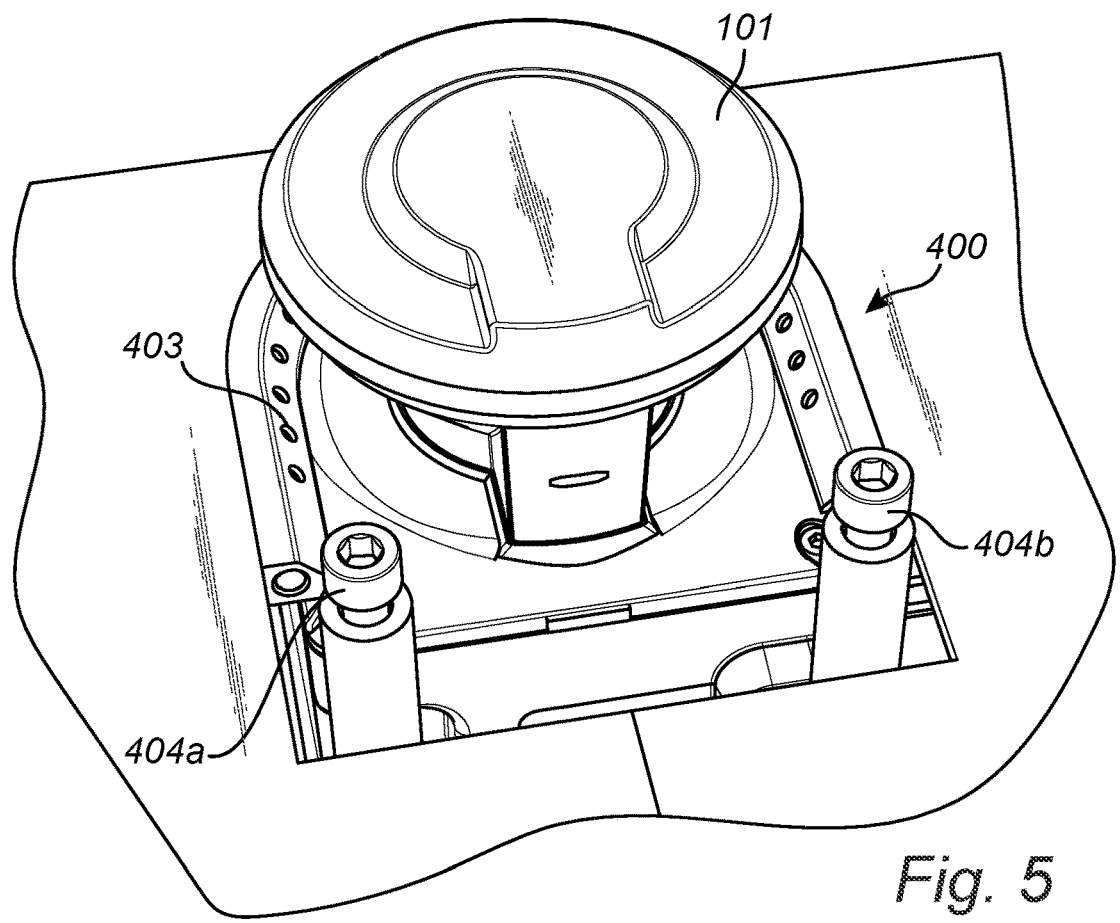
FIG. 5 shows a cleaning nozzle and a navigation sensor in an elevated rear view.
Figure 6:
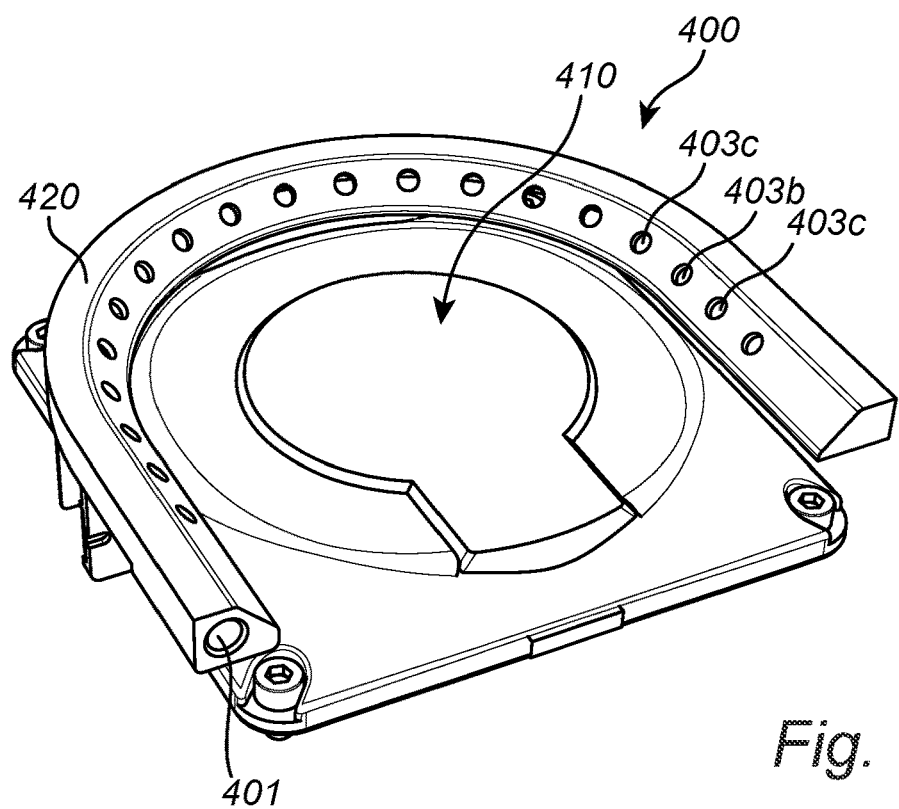
FIG. 6 shows a cleaning nozzle in an elevated view slightly from the left.

The nozzle is preferably attached to the autonomous vehicle with attachment means 404a, 404b, in FIG. 5 being illustrated as screws. Other attachment means may be used, such as glue, mating parts or other.

The nozzle 400 is designed to receive a fluid from e.g. a pressure high pressure air device. The fluid may also be another gas or a liquid such as water (with or without cleaning additions) or any other liquid. On order to receive the cleaning fluid, the nozzle 400 is provided with an inlet 401 illustrated in FIGS. 6 and 7. The inlet 401 is illustrated to be placed in an end portion of the nozzle. In other embodiments the inlet may have other placements on the nozzle. Preferably, the inlet is placed at a position where the inlet is accessible during charging of the autonomous vehicle. Hereby, the cleaning fluid may be injected during the charging operations.

The nozzle further comprises a channel 420 fluidly connected to the inlet. The channel comprises a plurality of outlets 403a, 403b, 403c for letting out the cleaning fluid injected into the inlet 401. The outlets are preferable distributed in the channel and at a distance from each other to spread the cleaning fluid along the extension of the channel. The channel 420 further has a curved extension which bends around an area where the navigational sensor 101 is positioned. Moreover, the plurality of outlets are positioned along the curved extension such that the flow directions 408a, 408b of the plurality of outlets vary with the curved extension. Hereby, the flow of cleaning fluid may surround the cleaning nozzle so that it is cleaned along the curved extension.

In the figures, the cleaning nozzle 400 has a curved extension extending in a horse-shoe shape so that the outlets 403 are positioned around a central position of a receiving area 410 for receiving said navigational sensor 101. The form of the horse-shoe shaped nozzle as illustrated means that the outlets are pointing towards the central area from about 270° around it. In other embodiments, the cleaning nozzle's extension may be shorter, so that the outlets are pointing towards the central area from about 180° or about 120° or about 90°. In each of these embodiments the flow direction 408b is directed towards the navigation sensor from different angels along the curved extension.

The cleaning nozzle 400 channel 420 comprises an inner side 424 and an outer side 426. The inner side 424 comprises said outlets 403, as the outlets then are facing towards the receiving area 410. The channel 420 also has a bottom side which may be closed in itself, or it may be open, as illustrated and closed by means of the arrangement onto the autonomous vehicle. The channel is however preferably hermetically sealed except for the inlet and the outlets, so as to control the ejection of the cleaning fluid from said nozzle.

In the illustrated example embodiment, the inner side 424 is formed in an angle α relative the plane in which the nozzle and receiving area is generally extended in. The plane may for example be a horizontal plane if the navigational sensor is to be placed on top of an autonomous vehicle, as is illustrated in this application. This plane is generally called the nozzel's extention plane below. It is of course so that the nozzle also has an extension in height, that is out of said plane.

The inner side may extent in an angle α relative the nozzel's extention plane, and the angle may be adjusted so that the outlets are facing inwards and upwards towards the navigational sensor, as illustrated. The angle α may for example be between 10°-80° or about 20°-70° or about 30°-60°. In the illustrated example the angle α is about 45°. This angle will be dependent on a radius r of the inner side and the height of the navigational sensor, in order to direct the cleaning fluid towards the navigational sensor.

Figure 7:
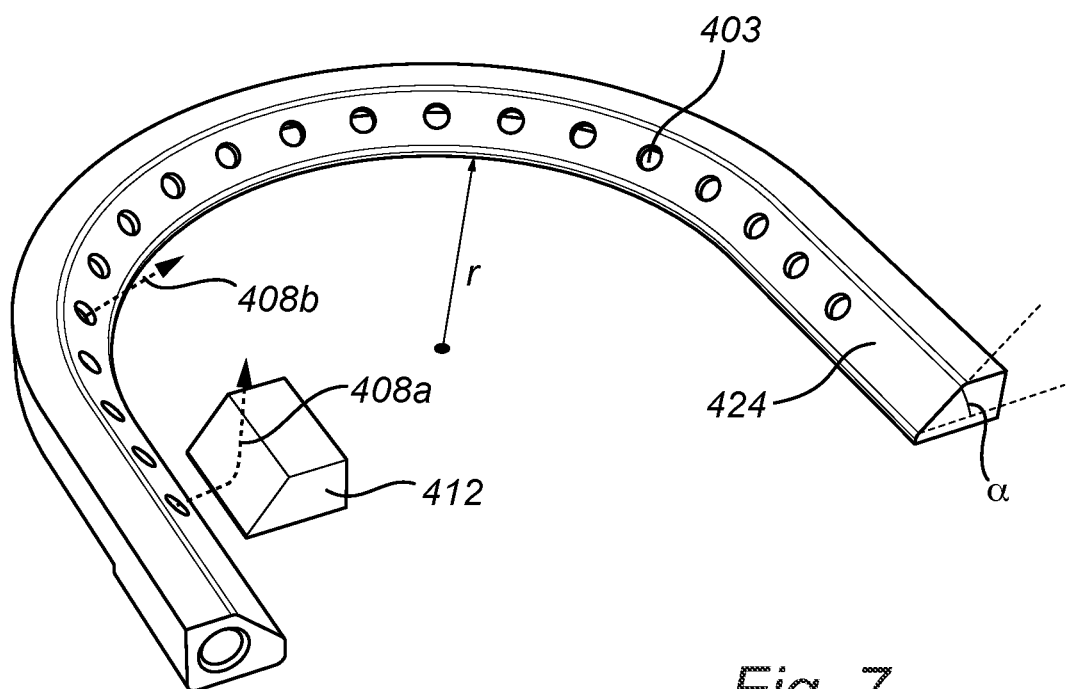
FIG. 7 shows a cleaning nozzle in an elevated view slightly from the left.
Figure 8:
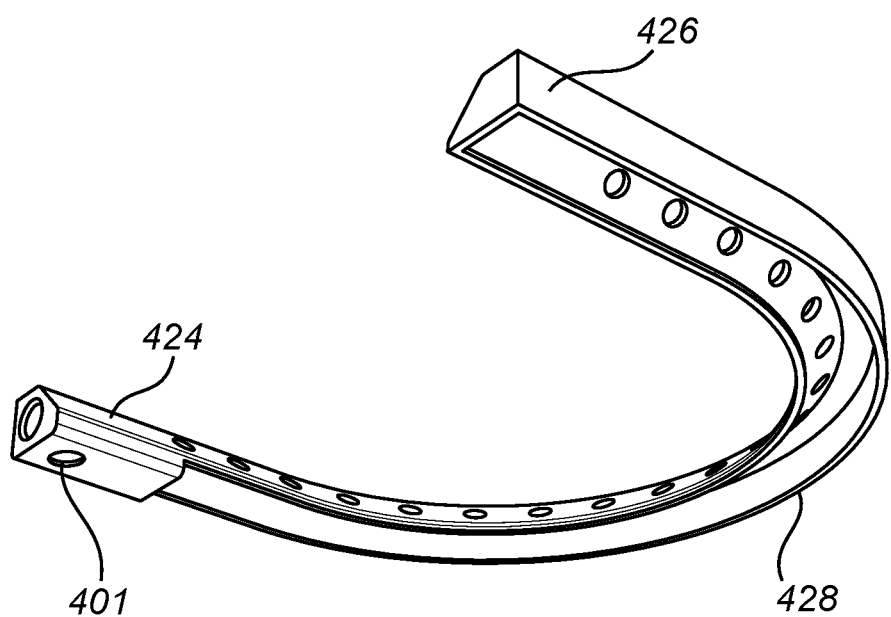
FIG. 8 shows a cleaning nozzle from underneath and slightly from the right.

Instead of having angled inner sides to achieve the cleaning fluid flow direction 408a, 408b, a directing means 412 such as a deflecting member as illustrated in FIG. 7 may be used. Thereby, even if the outlets are arranged parallel to the nozzel's extention plane, the flow direction may be directed towards the navigational sensor.

The radius r of the curved channel is adapted to the size of the navigational sensor. In the illustrated example the radius is about 50 mm, but can be adapted dependent on the size of the navigational sensor that is to be used. E.g. the radius r of curvature of the extension of the channel may be about 10 mm-100 mm, preferably about 20 mm-80 mm.

In some embodiments, the angle of the inner side, the bore angle of the outlet or any directing means, may have different angles for different outlets. By such an embodiment, the flow 408 may have a larger spread towards the navigational sensor.

It is further understood from the embodiments described above that the nozzel may be used in a navigation sensor cleaning system in a charging station for an autonomous vehicle. Such a navigation sensor cleaning system comprising would for example comprise the cleaning nozzle as described and preferably being fastened onto an autonomous vehicle. Moreover, such a system would need the cleaning fluid source for providing cleaning fluid into the inlet 401, and a control unit for activating the cleaning system upon detection of the presence of a navigation sensor to be cleaned.

The control unit may be the same control unit that is used for controlling the charging operation of the autonomous vehicle.

Figure 9:
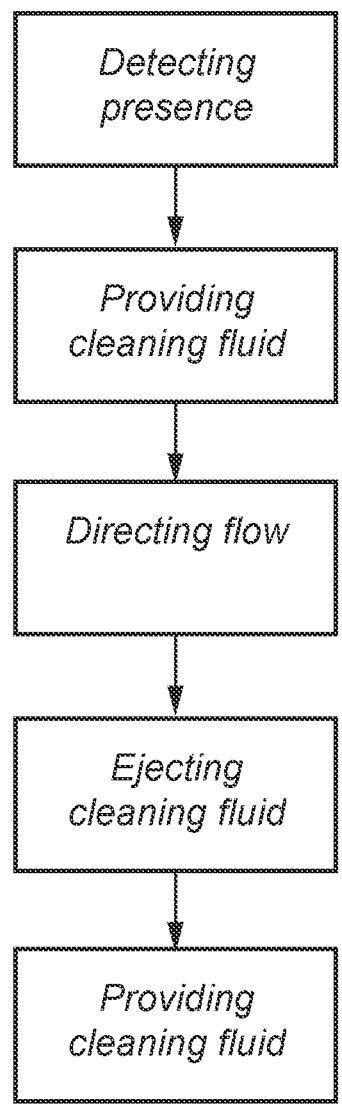
FIG. 9 shows a flowchart of a method of cleaning a navigation sensor.

In FIG. 9 a method for cleaning a navigation sensor on an autonomous vehicle, is further illustrated. The method comprises the steps of detecting the presence of a navigation sensor in a navigation sensor cleaning system. The detection can be achieved with e.g. motions sensor or electrical sensors or simply by detecting that a charging operation has been initiated.

Thereafter, the step of providing a cleaning fluid to the inlet 401 of the cleaning nozzle 400 is carried out. This may, as have been explained above e.g. be pressurise air, gas or a liquid that is fed to the inlet 401. In a third step, the injected cleaning fluid it directed along a curved extension of the channel 420 in the cleaning nozzle 400, as explained in conjunction with the nozzel above. And finally, the step of ejecting the cleaning fluid through a plurality of outlets 403 distributed in the channel and having a plurality of flow directions directed towards the navigation sensor 101 is carried out. The method as explained above may preferably be performed during charging operations of the autonomous vehicle. This will mean that the sensor may be cleaned when the autonomous vehicle is charged.

Please note that any aspect or part of an aspect as well as any method or part of method or any unit, feature or system could be combined in any applicable way if not clearly contradictory.

NUMBERED EMBODIMENTS

In the following, exemplifying numbered embodiments are provided. The numbered embodiments are not to be seen as limiting the scope of the invention, which is defined by the appended claims. The reference numerals in the different numbered embodiments are to be seen only as examples of elements in the appended drawings which correspond to elements described in the numbered embodiments.

1A. A cleaning nozzle for cleaning a navigation sensor on an autonomous vehicle, the cleaning nozzle comprising,
- an inlet for receiving a cleaning fluid from a stationary source of pressurised fluid,
- a channel, fluidly connected to the inlet, and
- at least one outlet distributed in the channel, for distributing the cleaning fluid for cleaning the navigation sensor.

2A. The cleaning nozzle according to embodiment 1A, wherein the inlet is configured for receiving pressurized air from a stationary source of pressurised air.

3A. The cleaning nozzle according to any one of embodiments 1A and 2A, wherein the channel has a curved extension.

4A. The cleaning nozzle according to any one of embodiments 1A-3A, wherein the channel comprises a plurality of outlets.

5A. The cleaning nozzle according to embodiment 4A, wherein the plurality of outlets are positioned along the curved extension such that the flow directions of the plurality of outlets vary with the curved extension. 6A. The cleaning nozzle according to any one of embodiment 3A-5A, wherein the curved extension extends at least 90°, preferably at least 180° and most preferably about 270°.

6A. The cleaning nozzle according to any one of embodiment 3A-5A, wherein the plurality of outlets are positioned on an inside of the curved extension.

7A. The cleaning nozzle according to any one of embodiment 3A-6A, wherein the flow directions of the plurality of outlets are configured for directing the cleaning fluid towards the navigation sensor from different angels along the curved extension.

8A. The cleaning nozzle according to any one of embodiment 3A-7A, wherein the curved extension of the channel extends mainly in a first plane and the flow direction of the plurality of outlets are configured for directing the cleaning fluid at least partly out of the first plane.

9A. The cleaning nozzle according to any one of embodiment 3A-8A, wherein the flow directions of the plurality of outlets have at least two different flow direction angles relative the first plane.

10A. The cleaning nozzle according to any one of embodiment 3A-9A, wherein the radius of curvature of the extension of the channel is about 10 mm-100 mm, preferably about 20 mm-80 mm.

11A. The cleaning nozzle according to any one of the preceding embodiments, wherein the nozzle comprises a receiving area for receiving a navigational sensor to be cleaned and wherein the receiving area is arranged on an inner side of the curved extension of the channel 12A. Navigation sensor cleaning system for a charging station for an autonomous vehicle, the navigation sensor cleaning system comprising:
- a cleaning nozzle according to any one of the preceding embodiments,
- a stationary cleaning fluid source for providing cleaning fluid into the inlet, and
- a control unit for activating the cleaning system upon detection of the presence of a navigation sensor to be cleaned.

13A. The navigation sensor cleaning system according to embodiment 12A, wherein the stationary cleaning fluid source is a stationary source of pressurized fluid.

14A. A Method for cleaning a navigation sensor on an autonomous vehicle, comprising the steps:
- detecting the presence of a navigation sensor in a navigation sensor cleaning system,
- providing a cleaning fluid from a stationary cleaning fluid source to an inlet of a cleaning nozzle,
- directing the flow of cleaning fluid by the cleaning nozzle, and
- ejecting a cleaning fluid through at least one outlet of the cleaning nozzle towards the navigation sensor.

15A. The method according to embodiment 14A, wherein at least one of the steps are performed during a charging of the autonomous vehicle.

16A. The method according to embodiment 14A, wherein the cleaning nozzle according to any one of embodiments 1A-11A, is used for carrying out the steps of directing and ejecting the cleaning fluid.

1B. A guiding vehicle (100) for an intralogistics system, wherein the guiding vehicle (100) is remote controlled or autonomous and configured to:
- be connected to a self-propelled load bearing cart (200), and
- guide and control the propulsion of the self-propelled load bearing cart (200) such that the self-propelled load bearing cart (200) can transport a load in the intralogistics system, the guiding vehicle (100) comprising:
  - at least one drive wheel (103) configured to engage a floor surface for propelling the guiding vehicle (100),
  - at least one additional wheel (121),
  - a mechanical connector (170) for mechanically connecting the guiding vehicle (100) to the self-propelled load bearing cart (200), characterized in that
  - the guiding vehicle (100) being configured to at least one of: send and receive navigation data to or from the self-propelled load bearing cart (200), and in that
  - the guiding vehicle (100) is configured to maintain constant traction between the at least one drive wheel (103) and the floor surface when the guiding vehicle (100) is connected to the self-propelled load bearing cart (200) by means of the mechanical connector (170), such that constant traction between the at least one drive wheel (103) and the floor surface can be maintained when the interconnected guiding vehicle (100) and self-propelled load bearing cart (200) travels over an uneven floor surface.

2B. The guiding vehicle (100) according to embodiment 1B, wherein the guiding vehicle (100) is configured such that the at least one additional wheel (121) is lifted from the floor surface while the drive wheel (103) remains in contact with the floor surface when the guiding vehicle (100) is connected to the self-propelled load bearing cart (200).

3B. The guiding vehicle (100) according to any one of embodiment 1B and 2B, further comprising at least one of an actuator and an elastic element configured to at least one of:
- lift the additional wheel (121) from the floor surface when the guiding vehicle (100) is connected to the self-propelled load bearing cart (200), and
- act as suspension for the additional wheel (103) when the guiding vehicle (100) is connected to the self-propelled load bearing cart (200).

4B. The guiding vehicle (100) according to any one of the preceding embodiments, wherein the mechanical connector (170) is configured to be connected by means of a horizontal movement, along the floor surface, between the guiding vehicle (100) and the self-propelled load bearing cart (200).

5B. The guiding vehicle (100) according to any one of the preceding embodiments, wherein the mechanical connector comprises an actuator for moving the mechanical connector vertically in relation to the floor surface and thereby mechanically connect the guiding vehicle (100) to the self-propelled load bearing cart (200).

6B. The guiding vehicle according to any one of embodiments 3B-5B, wherein the elastic element configured to act as suspension for the additional wheel (121) is configured to:
be substantially unaffected by the weight of guiding vehicle (100) alone, and
be elastically deformed by the combined weight of the guiding vehicle (100) and the self-propelled load bearing cart (200), such that the elastic element acts as suspension for the additional wheel (121) when the guiding vehicle (100) is connected to the self-propelled load bearing cart (200).

7B. The guiding vehicle (100) according to any one of the preceding embodiments, further comprising an electrical connector (174,175) for electrically connecting the guiding vehicle (100) to the self-propelled load bearing cart (200).

8B. The guiding vehicle (100) according to embodiment 6B, wherein the guiding vehicle (100) comprises an electrical energy storage, and wherein the guiding vehicle (100) is configured to transfer electrical energy from the electrical energy storage to the self-propelled load bearing cart (200) by means of the electrical connector (174,175), for at least one of: propelling the self-propelled load bearing cart (200) and handling the load placed on the self-propelled load bearing cart (200).

9B. The guiding vehicle according to any one of the preceding embodiments, wherein the mechanical connector (170) comprises a recess (173) or a protrusion for connection with a corresponding recess or protrusion (273) positioned on the self-propelled load bearing cart (200), and wherein the recess or protrusion comprises a slanted surface configured to provide a lifting force that lifts the additional wheel (121) from the floor surface.

10B. The guiding vehicle (100) according to any one of the preceding embodiments, further comprising at least one of:
a connector for a pressurized fluid (176), such that a pressurized fluid can be transferred to or from the guiding vehicle (100), and
a connector for transferring visible light (177) from the guiding vehicle (100) to the self-propelled load bearing cart (200).

11B. The guiding vehicle according to any one of embodiments 6B-10B, wherein at least one of the electrical connector (174,175), the connector for a pressurized fluid (176) and the connector for transferring visible light (177) is part of an integrated connector together with the mechanical connector enabling simultaneous connection of the mechanical connector and at least one of the electrical connector, the connector for a pressurized fluid and the connector for transferring visible light 12B. The guiding vehicle (100) according to any one of the preceding embodiments, wherein the guiding vehicle (100) is smaller than the self-propelled load bearing cart (200) and configured to be placed within the footprint of the self-propelled load bearing cart (200) and underneath the load carried by the self-propelled load bearing cart (200).

13B. A self-propelled load bearing cart (200) for use in an intralogistics system, the self-propelled load bearing cart (200) being configured to:
be connected to the guiding vehicle (100) according to any one of embodiments 1-12, and
be guided and controlled by the guiding vehicle (100) such that the self-propelled load bearing cart (200) can transport a load in the intralogistics system, the self-propelled load bearing cart (200) comprising:
at least one motor (205) connected to a drive wheel (203) configured to engage a floor surface for propelling the self-propelled load bearing cart (200),
a mechanical connector (270) for mechanically connecting the self-propelled load bearing cart (200) to the guiding vehicle (100), wherein the self-propelled load bearing cart (100) provides sectors of unobstructed visibility (S1,S2) in a first plane (P1) for at least one navigation sensor (101a,101b) placed on the guiding vehicle (100), when the guiding vehicle (100) is placed within the footprint of the self-propelled load bearing cart (200) and connected to the self-propelled load bearing cart (200), the unobstructed visibility being more than 100 degrees in a first direction and more than 100 degrees in the opposite direction in the first plane.

14B. The self-propelled load bearing cart (100) according to embodiment 13B, wherein the self-propelled load bearing cart (200) comprises lighting elements (272) configured to be illuminated by visible light transferred from the guiding vehicle (100) by means of the connector for transferring visible light (277).

15B. The self-propelled load bearing cart (200) according to any one of embodiments 13B and 14B, wherein the self-propelled load bearing cart (200) comprises at least one emergency switch (280) configured to be pressed by an operator, and wherein the self-propelled load bearing cart (280) is configured to transfer a signal from the at least one emergency switch to the guiding vehicle (100).

The different aspects or any part of an aspect of the different numbered embodiments or any part of an embodiment may all be combined in any possible way. Any method embodiment or any step of any method embodiment may be seen also as an apparatus description, as well as, any apparatus embodiment, aspect or part of aspect or part of embodiment may be seen as a method description and all may be combined in any possible way down to the smallest detail. Any detailed description should be interpreted in its broadest outline as a general summary description.

What is claimed is:

1. A self-propelled guiding vehicle for an intralogistics system, wherein the self-propelled guiding vehicle is remote controlled or autonomous and configured to be connected to a self-propelled load bearing cart, and guide and control a propulsion of the self-propelled load bearing cart such that the self-propelled load bearing cart can transport a load in the intralogistics system, the self-propelled guiding vehicle comprising:
a mechanical connector for mechanically connecting the self-propelled guiding vehicle to the self-propelled load bearing cart, and
a connector for transferring data, wherein:
the self-propelled guiding vehicle is configured to receive navigation data from the self-propelled load bearing cart, using the connector for transferring data, in the form of information concerning a movement of a drive wheel of the self-propelled load bearing cart obtained from at least one motor of the self-propelled load bearing cart or from at least one encoder connected to the drive wheel,
the self-propelled guiding vehicle is configured to be completely lifted from a floor surface when connected to the self-propelled load bearing cart, and the self-propelled guiding vehicle is smaller than the self-propelled load bearing cart.

2. The self-propelled guiding vehicle according to claim 1, wherein the self-propelled guiding vehicle comprises an electrical energy storage, and wherein the self-propelled guiding vehicle is configured to transfer electrical energy from the electrical energy storage to the self-propelled load bearing cart by means of the electrical connector, for at least one of: propelling the self-propelled load bearing cart and handling the load placed on the self-propelled load bearing cart.

3. The self-propelled guiding vehicle according to claim 1, wherein the mechanical connector comprises a recess or a protrusion for connection with a corresponding recess or protrusion positioned on the self-propelled load bearing cart.

4. The self-propelled guiding vehicle according to claim 1, wherein the self-propelled guiding vehicle is configured to receive an emergency stop signal from the self-propelled load bearing cart, and wherein the self-propelled guiding vehicle is configured to control the propulsion of the self-propelled load bearing cart on the basis of the received emergency stop signal.

5. The self-propelled guiding vehicle according to claim 4, wherein the self-propelled guiding vehicle is configured to receive the emergency stop signal from at least one contact sensor on the self-propelled load bearing cart.

6. The self-propelled guiding vehicle according to claim 4, wherein the self-propelled guiding vehicle is configured to receive the emergency stop signal from at least one emergency switch on the self-propelled load bearing cart, the emergency switch being configured to be pressed by an operator.

7. The self-propelled guiding vehicle according to claim 1, wherein the mechanical connector is configured to be connected by means of a horizontal movement, along the floor surface, between the self-propelled guiding vehicle and the self-propelled load bearing cart.

8. The self-propelled guiding vehicle according to claim 1, further comprising at least one of:
a connector for a pressurized fluid, such that a pressurized fluid can be transferred to or from the self-propelled guiding vehicle, and
a connector for transferring visible light from the self-propelled guiding vehicle to the self-propelled load bearing cart.

9. A self-propelled load bearing cart for use in an intralogistics system, the self-propelled load bearing cart being configured to:
be connected to the self-propelled guiding vehicle according to claim 1, and
be guided and controlled by the self-propelled guiding vehicle such that the self-propelled load bearing cart can transport a load in the intralogistics system, the self-propelled load bearing cart comprising:
at least one motor connected to a drive wheel configured to engage a floor surface for propelling the self-propelled load bearing cart,
a mechanical connector for mechanically connecting the self-propelled load bearing cart to the self-propelled guiding vehicle,
a connector for transferring data, wherein:
the self-propelled load bearing cart is configured to transmit navigation data to the self-propelled guiding vehicle, using the connector for transferring data, in the form of information concerning a movement of the drive wheel of the self-propelled load bearing cart obtained from the at least one motor of the self-propelled load bearing cart, or from at least one encoder connected to the drive wheel,
the self-propelled load bearing cart is larger than the self-propelled guiding vehicle, and
the self-propelled guiding vehicle is configured to be completely lifted from a floor surface, such that the load of the self-propelled guiding vehicle is carried by the self-propelled load bearing cart.

10. The self-propelled load bearing cart according to claim 9, wherein the self-propelled load bearing cart is configured to receive electrical energy from an electrical energy storage of the self-propelled guiding vehicle by the electrical connector, for at least one of: propelling the self-propelled load bearing cart and handling the load placed on the self-propelled load bearing cart.

11. The self-propelled load bearing cart according to claim 9, wherein the self-propelled load bearing cart is configured to transmit an emergency stop signal to the self-propelled guiding vehicle, and wherein the propulsion of the self-propelled load bearing cart is configured to be controlled by the self-propelled guiding vehicle on the basis of the transmitted emergency stop signal.

12. The self-propelled load bearing cart according to claim 11, wherein the self-propelled load bearing cart comprises at least one contact sensor, and wherein the emergency stop signal is generated by the at least one contact sensor.

13. The self-propelled load bearing cart according to claim 11, wherein the self-propelled load bearing cart comprises at least one emergency switch, and wherein the emergency stop signal is generated by the at least one emergency switch.

14. The self-propelled load bearing cart according to claim 9, wherein the mechanical connector comprises a recess or a protrusion for connection with a corresponding recess or protrusion positioned on the self-propelled guiding vehicle.

15. The self-propelled load bearing cart according to claim 9, further comprising at least one of:
a connector for a pressurized fluid, such that a pressurized fluid can be transferred to or from the self-propelled load bearing cart, and
a connector for transferring visible light from the self-propelled guiding vehicle to the self-propelled load bearing cart.

16. The self-propelled load bearing cart according to claim 15, wherein the self-propelled load bearing cart comprises lighting elements configured to be illuminated by visible light transferred from the self-propelled guiding vehicle by means of a connector for transferring visible light.

* * * * *